United States Patent
Bora et al.

(10) Patent No.: US 12,008,018 B2
(45) Date of Patent: Jun. 11, 2024

(54) SYNCHRONOUS REMOTE REPLICATION OF SNAPSHOTS

(71) Applicant: EMC IP Holding Company LLC, Hopkinton, MA (US)

(72) Inventors: Bhaskar Bora, Shrewsbury, MA (US); Deepak Vokaliga, Hopkinton, MA (US); Mark J. Halstead, Holliston, MA (US); Jeffrey Wilson, Franklin, MA (US); William R. Stronge, Westford, MA (US); Ian Adams, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 17/237,127

(22) Filed: Apr. 22, 2021

(65) Prior Publication Data

US 2022/0342908 A1 Oct. 27, 2022

(51) Int. Cl.
*G06F 16/27* (2019.01)
*G06F 11/14* (2006.01)

(52) U.S. Cl.
CPC ............ *G06F 16/275* (2019.01); *G06F 16/27* (2019.01); *G06F 11/1446* (2013.01); *G06F 2201/84* (2013.01)

(58) Field of Classification Search
CPC ...... G06F 16/27; G06F 16/275; G06F 16/128; G06F 16/1844; G06F 11/1469; G06F 11/2064; G06F 11/2082; G06F 11/1446; G06F 11/2056; G06F 2201/84
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 7,340,489 B2 | 3/2008 | Vishlitzky et al. | |
| 7,613,890 B1 * | 11/2009 | Meiri ................. | G06F 11/2064 711/112 |
| 9,880,946 B1 | 1/2018 | Yoder et al. | |
| 9,965,216 B1 | 5/2018 | Jaganathan et al. | |

(Continued)

OTHER PUBLICATIONS

U.S. Appl. No. 16/885,702, filed May 28, 2020, Tobin et al.

*Primary Examiner* — Marcin R Filipczyk
(74) *Attorney, Agent, or Firm* — Muirhead and Saturnelli, LLC

(57) ABSTRACT

Snapshots from a first LSU (R1) on a first storage system (A1) may be replicated to a second replica LSU (R2) on a second storage system (A2), for example, concurrently to remotely replicating (e.g., synchronously) write operations for R1 to R2. A process, P, on A1 executing the replication of the snapshots from R1 to R2 may be a separate process than the one or more processes on A1 executing remote replication of write operations for R1 to R2. During a consistency window on A1, outstanding write operations for R1 at the time the consistency window opened may be logged, and a pair of snapshots, $SS1_1$ and $SS1_2$ may be activated on R1 and R2, respectively. After the consistency window has closed, the $SS1_2$ snapshot metadata and snapshot data may be updated based on the outstanding write operations.

20 Claims, 14 Drawing Sheets

(56) References Cited

U.S. PATENT DOCUMENTS

| | | | |
|---|---|---|---|
| 10,860,457 B1* | 12/2020 | Evenson | G06F 11/3495 |
| 2015/0113317 A1* | 4/2015 | Ouyang | G06F 11/2097 |
| | | | 714/6.3 |
| 2015/0288758 A1* | 10/2015 | Ori | G06F 11/2094 |
| | | | 709/202 |
| 2016/0371007 A1* | 12/2016 | Shani | G06F 11/1464 |
| 2017/0228181 A1* | 8/2017 | Chen | G06F 11/1446 |
| 2018/0260125 A1* | 9/2018 | Botes | G06F 11/2094 |

\* cited by examiner

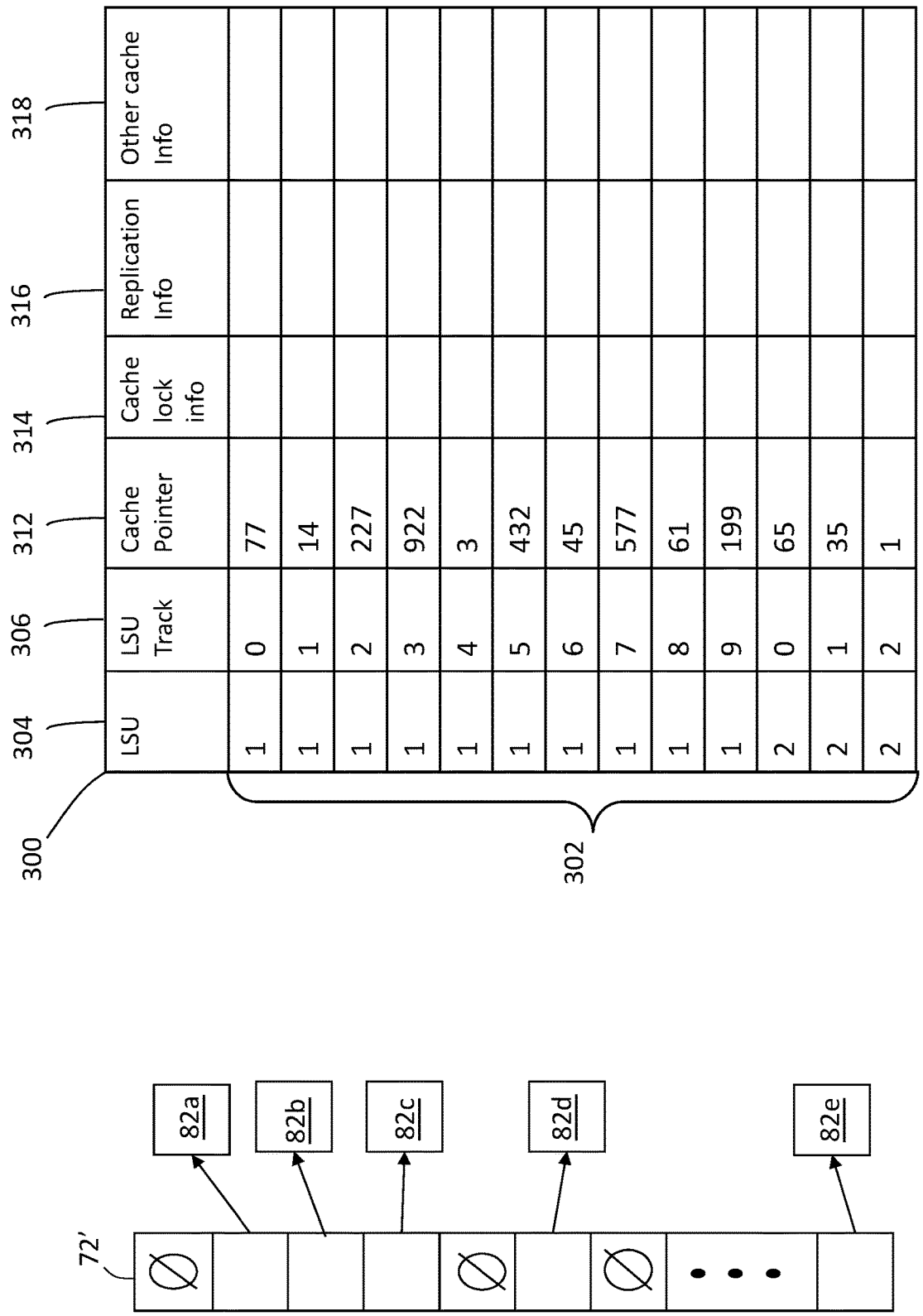

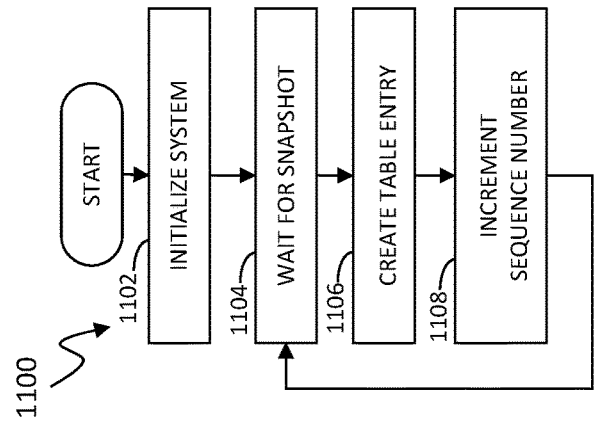
FIG. 10
FIG. 11
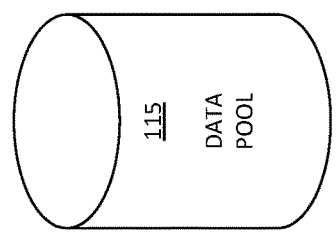
FIG. 8
FIG. 9

SYNCHRONOUS REMOTE REPLICATION OF SNAPSHOTS

BACKGROUND

Technical Field

This application generally relates to data storage networks, and more particularly to remotely replicating snapshots from one storage system to another storage system on a storage network.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (I/O) operations utilizing a physical storage device of the storage system, one or more components of the host system, storage system and network components therebetween may be used. The one or more combinations of components of the host, switching fabric and storage system over which I/O operations between an application and the storage system may be communicated may be considered an I/O path between the application and the storage system. It should be appreciated that other combinations of components of a storage network, for example, two or more storage systems, also may be coupled together by one or more switches of a switching fabric. Thus, more generically, the one or more combinations of components of a first network component, switching fabric and second network component over which I/O communications may be communicated may be considered an I/O path between the two network components. The collective I/O paths between components of a storage network may be considered to define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method may be performed for a system including a host system, a first storage system, a second storage system, a first logical storage unit for which data is replicated from the first storage system to a second logical storage unit of the second storage system, a method of remotely replicating a first snapshot of the first logical storage unit from the first storage system to the second storage system. The method includes: at a first point in time, suspending initiating of processing on the first storage system of new write requests for the first logical storage unit received from the host system after the first point in time; recording at least a first outstanding write request for the first logical storage unit on the first storage system that is outstanding at the first point in time; activating the first snapshot on the first storage system; initiating activation on the second storage system of a second snapshot of the second logical storage unit as a remote replica of the first snapshot; after the recording, the activating and the initiating: resuming the initiating of processing of new write requests for the first logical storage unit on the first storage system, and applying the at least first outstanding write request to the second snapshot. The applying may be performed as part of a process executing independently of, and concurrently with, one or more processes that are remotely replicating write operations of the first logical storage unit to the second logical storage unit. Applying the at least first outstanding write request may include, for each outstanding write request of the at least first outstanding write request: determining whether the outstanding write request requires modification of snapshot data of the second snapshot; and, if it is determined that the outstanding write request requires modification of the snapshot, modifying the snapshot data and snapshot metadata of the second snapshot on the second storage system based on the outstanding write request. The first outstanding write request may specify a write operation for a first logical storage element corresponding to a second logical storage element of the second logical storage unit, and determining whether the first outstanding write request requires modification of snapshot data of the second snapshot may include: determining whether first snapshot metadata of the first snapshot references a first current value of the first logical storage element on the first storage system; determining whether second snapshot metadata of the second snapshot references a second current value of the second logical storage element on the second storage system; and determining whether to modify the snapshot data and snapshot metadata of the second snapshot based at least in part on whether the first snapshot metadata references the first current value and whether the second snapshot metadata references the second current value. Determining whether the first outstanding write request requires modification of snapshot data of the second snapshot may include: determining that the first snapshot metadata references the first current value of the first logical storage element; determining that the second snapshot metadata does not reference the second current value of the second logical storage element; and modifying the snapshot metadata of the second snapshot to reference the second current value of the second logical storage element. Determining whether the first outstanding write request requires modification of snapshot data of the second snapshot may include: determining whether a first value of the second logical storage element specified by the second snapshot metadata is a same value as a second value of the second logical storage element specified by the write operation; and determining whether to modify the snapshot data and snapshot metadata of the second snapshot based at least in part on whether the first value is the same value as the second value. Determining whether the first outstanding write request requires modification of snapshot data of the second snapshot may include: determining that the first snapshot metadata does not reference the first current value of the first logical storage element; determining that the second snapshot metadata does not reference the second current value of the second logical storage element; storing the second value of the second logical storage element at a location on the second storage system; and modifying the snapshot metadata of the second snapshot to reference the location.

In another embodiment of the invention, as system includes: a first storage system; a second storage system; a third storage system; a logical storage unit synchronously replicated between the first storage system and the second system, wherein the logical storage unit is asynchronously replicated from the first storage system to the third storage system and asynchronously replicated from the second storage system to the third storage system; and executable logic that implements a method. The method includes: at a first point in time, suspending initiating of processing on the first storage system of new write requests for the first logical storage unit received from the host system after the first point in time, recording at least a first outstanding write request for the first logical storage unit on the first storage system that is outstanding at the first point in time, activating the first snapshot on the first storage system, initiating activation on the second storage system of a second snapshot of the second logical storage unit as a remote replica of the first snapshot; and, after the recording, the activating and the initiating: resuming the initiating of processing of new write requests for the first logical storage unit on the first storage system, and applying the at least first outstanding write request to the second snapshot. The applying may be performed as part of a process executing independently of, and concurrently with, one or more processes that are remotely replicating write operations of the first logical storage unit to the second logical storage unit. Applying the at least first outstanding write request may include, for each outstanding write request of the at least first outstanding write request: determining whether the outstanding write request requires modification of snapshot data of the second snapshot; and, if it is determined that the outstanding write request requires modification of the snapshot, modifying the snapshot data and snapshot metadata of the second snapshot on the second storage system based on the outstanding write request. The first outstanding write request may specify a write operation for a first logical storage element corresponding to a second logical storage element of the second logical storage unit, and determining whether the first outstanding write request requires modification of snapshot data of the second snapshot may include: determining whether first snapshot metadata of the first snapshot references a first current value of the first logical storage element on the first storage system; determining whether second snapshot metadata of the second snapshot references a second current value of the second logical storage element on the second storage system; and determining whether to modify the snapshot data and snapshot metadata of the second snapshot based at least in part on whether the first snapshot metadata references the first current value and whether the second snapshot metadata references the second current value. Determining whether the first outstanding write request requires modification of snapshot data of the second snapshot may include: determining that the first snapshot metadata references the first current value of the first logical storage element; determining that the second snapshot metadata does not reference the second current value of the second logical storage element; and modifying the snapshot metadata of the second snapshot to reference the second current value of the second logical storage element. Determining whether the first outstanding write request requires modification of snapshot data of the second snapshot may include: determining whether a first value of the second logical storage element specified by the second snapshot metadata is a same value as a second value of the second logical storage element specified by the write operation; and determining whether to modify the snapshot data and snapshot metadata of the second snapshot based at least in part on whether the first value is the same value as the second value. Determining whether the first outstanding write request requires modification of snapshot data of the second snapshot may include: determining that the first snapshot metadata does not reference the first current value of the first logical storage element; determining that the second snapshot metadata does not reference the second current value of the second logical storage element; storing the second value of the second logical storage element at a location on the second storage system; and modifying the snapshot metadata of the second snapshot to reference the location.

In another embodiment of the invention, for a system including a host system, a first storage system, a second storage system, a first logical storage unit for which data is replicated from the first storage system to a second logical storage unit of the second storage system, computer-readable media having software thereon defining a method of remotely replicating a first snapshot of the first logical storage unit from the first storage system to the second storage system is provided. The software includes: executable code that controls suspending, at a first point in time, initiating of processing on the first storage system of new write requests for the first logical storage unit received from the host system after the first point in time; executable code that controls recording at least a first outstanding write request for the first logical storage unit on the first storage system that is outstanding at the first point in time; executable code that controls activating the first snapshot on the first storage system; executable code that controls initiating activation on the second storage system of a second snapshot of the second logical storage unit as a remote replica of the first snapshot; executable code that controls, after the recording, the activating and the initiating: resuming the initiating of processing of new write requests for the first logical storage unit on the first storage system, and applying the at least first outstanding write request to the second snapshot. Applying the at least first outstanding write request may include, for each outstanding write request of the at least first outstanding write request: determining whether the outstanding write request requires modification of snapshot data of the second snapshot; and, if it is determined that the outstanding write request requires modification of the snapshot, modifying the snapshot data and snapshot metadata of the second snapshot on the second storage system based on the outstanding write request. The first outstanding write request may specify a write operation for a first logical storage element corresponding to a second logical storage element of the second logical storage unit, and determining whether the first outstanding write request requires modification of snapshot data of the second snapshot may include: determining whether first snapshot metadata of the first snapshot references a first current value of the first logical storage element on the first storage system; determining whether second snapshot metadata of the second snapshot references a second current value of the second logical storage element on the second storage system; and determining whether to modify the snapshot data and snapshot metadata of the second snapshot based at least in part on whether the first snapshot metadata references the first current value and whether the second snapshot metadata references the second current value. Determining whether the first outstanding write request requires modification of snapshot data of the second snapshot may include: determining that the first snapshot metadata references the first current value of the first logical storage element; determining that the second snapshot metadata does not reference the second current value of the second logical storage element; and modifying the snapshot metadata of the second snapshot to reference the second current value of the second logical storage element. Determining whether the first outstanding write request requires modification of snapshot data of the second snapshot may include: determining whether a first value of the second logical storage element specified by the second snapshot metadata is a same value as a second value of the second logical storage element specified by the write operation; and determining whether to modify the snapshot data and snapshot metadata of the second snapshot based at least in part on whether the first value is the same value as the second value. Determining whether the first outstanding write request requires modification of snapshot data of the second snapshot may include: determining that the first snapshot metadata does not reference the first current value of the first logical storage element; determining that the second snapshot metadata does not reference the second current value of the second logical storage element; storing the second value of the second logical storage element at a location on the second storage system; and modifying the snapshot metadata of the second snapshot to reference the location.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 5 is a block diagram illustrating an example of a data structure for mapping logical storage unit tracks to cache slots, according to embodiments of the invention;

FIG. 8 is a diagram illustrating an example of a data pool, according to embodiments of the invention;

FIG. 9 is a diagram illustrating an example of a snapshot table, according to embodiments of the invention;

FIG. 10 is a diagram s illustrating an example of a sequence number pointer table, according to embodiments of the invention;

FIG. 11 is a flow diagram illustrating processing performed in connection with initiating a targetless snapshot, according to embodiments of the invention;

DETAILED DESCRIPTION OF EMBODIMENTS

Figure 1:
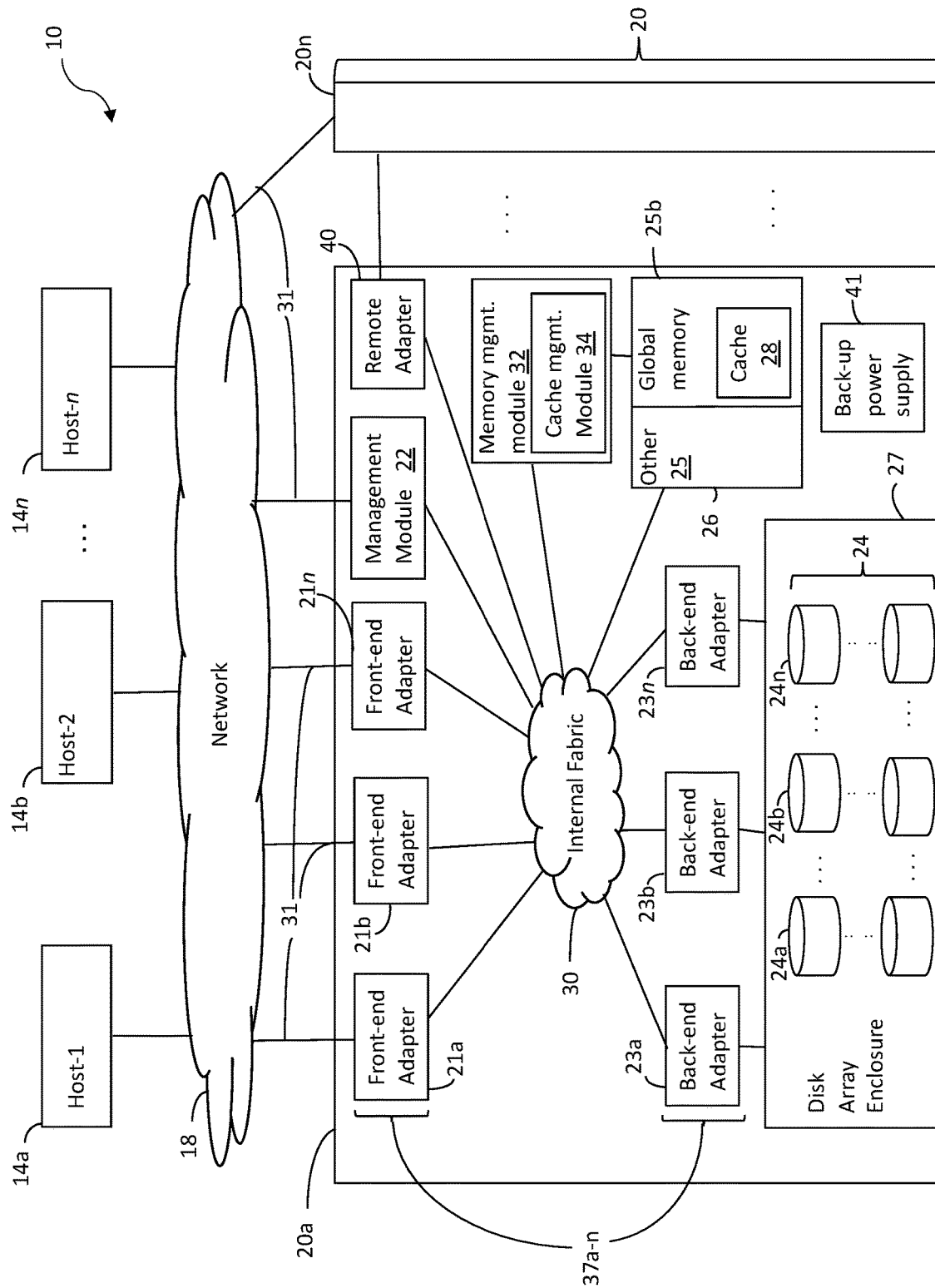
FIG. 1 is a block diagram illustrating an example of a data storage network, according to embodiments of the invention.

On some data storage networks, remote data replication is employed between two or more storage systems, where LSUs from each storage system are logically paired so that the data of an LSU (R1) on one storage system (A1), which may be referred to herein a "primary storage system," is remotely replicated to another LSU (R2, e.g., a replica LSU) on the other storage system (A2), which may be referred to herein as a secondary storage system. This remote replication may be performed synchronously (synchronous replication) or asynchronously (asynchronous replication), as described in more detail elsewhere herein.

On some storage systems today, local replication (i.e., to another location on a same storage system) of an LSU may be performed using snapshots, where a snapshot defines a point-in-time image of an LSU; i.e., the state of an LSU at the point in time. There are several known techniques for implementing snapshots, including those described in U.S. Pat. No. 7,340,489 to Vishlitzky, et al. titled "Virtual Storage Devices," issued Mar. 4, 2008, U.S. Pat. No. 9,965,216 to Jaganathan et al., titled "Targetless Snapshots," issued May 8, 2018 ("Jaganathan"), and U.S. patent application Ser. No. 16/885,702 to Tobin et al., titled "Snapshot Metadata Deduplication," filed May 28, 2020 ("Tobin"), the entire contents of each of which is hereby incorporated by reference.

It may be desirable to remotely replicate snapshots from one storage system (A1) to another storage system (A2). In some embodiments of the invention, remote replication of snapshots may be managed manually, for example, via a host system. For example, when targetless snapshots are employed, a user may manually link an LSU (a target LSU) to an outstanding snapshot of R1 on A1, e.g., as described in Jaganathan or Tobin. The target LSU may be configured for standard replication (e.g., Dell EMC™ SRDF® as described in more detail herein) such that the target LSU is replicated to A2. The user also may configure A2 to create a snapshot of the target LSU once it is fully replicated to A2, thereby producing a snapshot on A2 that is a replica of the outstanding snapshot of R1 to which the target LSU was linked. However, the foregoing approach may require significant manual effort, and the consumption of resources that could otherwise be engaged in the remote replication of write operations from R1 to R2, as opposed to snapshot replication. Such consumption of resources may result in disruption or performance degradation of remote replication, especially if snapshots are created frequently and/or the LSUs involved have high levels of write activity, which increases the amount of snapshot data that needs to be transferred and snapshot metadata that needs to be updated.

What may be desirable is a way to remotely replicate snapshots that does not have the potential drawbacks described above.

Described herein are techniques and mechanisms for remotely replicating snapshots from a first LSU (R1) on a first storage system (A1) to a second replica LSU (R2) on a second storage system (A2), for example, concurrently to remotely replicating (e.g., synchronously) write operations for R1 to R2. A process, P, on A1 executing the replication of the snapshots from R1 to R2 may be a separate process than the one or more processes on A1 executing remote replication of write operations for R1 to R2. In some embodiments, the process P may be given low priority on A1 so as to not impair performance of other operations (including remote replication of write operations on A1. For example, the process P may be run as a background process on A1.

In the following description, a snapshot of R1 may be referred to herein as $SSn_1$, where n is an ID (e.g., number) of the snapshot, and the number "1" indicates that the snapshot is of R1. A snapshot of R2 that is a replica of a snapshot of R1 may be referred to herein as $SSn_2$, where n is an ID (e.g., number) of the snapshot being replicated, and the number "2" indicates that the snapshot is of R2. For example, a first snapshot of R1 may be referred to herein as $SS1_1$, and a replica snapshot of the first snapshot, a snapshot of R2, may be referred to herein as $SS1_2$; and a second snapshot of R1 may be referred to herein as $SS2_1$, and a replica snapshot of the second snapshot, a snapshot of R2, may be referred to herein as $SS2_2$, and so on.

In some embodiments, during a first period of time (referred to herein as a "consistency window"), outstanding write operations for R1 may be recorded, and a pair of snapshots, $SS1_1$ and $SS1_2$ may be activated on R1 and R2, respectively. $SS1_2$ may be updated based on the write operations during a second period of time after the consistency window has closed. For example, at a first point in time (T1, marking the beginning of a consistency window), the initiating of processing on A1 of new write requests for R1 received from any host system after the first point in time may be suspended, and any write request for the first LSU that is outstanding at the first point in time may be recorded (e.g., logged in a data structure) on A1. As used herein, an "outstanding I/O request" is an I/O request for which processing has been initiated on a storage system but for which the storage system has not yet acknowledged to the host system that the storage system has completed the I/O request. During the consistency window, $SS1_1$ may be taken (i.e., activated) on A1, and $SS1_2$ of R2 may be taken. At least initially, $SS1_2$ may not be an exact replica of $SS1_1$ given that $SS1_2$ may have been taken before write operations of R1 have been replicated to R2. The actions of suspending initiating of write operation, recording outstanding write operations and activating $SS1_1$ and $SS1_2$ may be considered part of a first phase (Phase 1) of remotely replicating snapshots.

As used herein, "taking a snapshot" (or synonymously "activating a snapshot") means updating snapshot metadata for an LSU so that a latest snapshot reflects the state of an LSU (e.g., R1) at the current point in time (i.e., the point in time the snapshot is taken). It should be appreciated that a snapshot may be created prior to being taken/activated in that that basic parameters (e.g., an ID, sequence number) of the snapshot may be defined, for example, as described in Jaganathan, before the snapshot is taken.

After a time, T2, marking the end of the consistency window, the initiating of processing of new write requests for R1 on A1 may be resumed, and the one or more outstanding write requests applied to $SS1_2$. The outstanding write requests may be applied concurrently to the ongoing replication of write requests from R1 to R2, for example as part of a separate (e.g., background) process. Applying the outstanding write requests may be considered a second phase (Phase II) of remotely replicating snapshots.

Applying the outstanding write requests for $SS1_1$ in Phase 2 may include processing on A1 and A2. The A1 processing may include accessing a data structure on A1 in which outstanding write requests are logged. In some embodiments, the log entries may be indexed according to the logical storage element (LSE) of R1 to which they apply. LSEs, for example, tracks, sub-portions thereof, or other types of elements or portions thereof, are described in more detail elsewhere herein. The $SS1_1$ metadata of an LSE for R1 ("R1 LSE") may be in one of two general R1 LSE states when processing begins on the R1 LSE during Phase 2: 1) pointing (directly or indirectly) to the current data of the R1 LSE; or 2) pointing (directly or indirectly) to snapshot data of the R1 LSE. It should be appreciated that, as used herein, a thing (e.g., metadata) that "references" or "points to" another thing (e.g., data), without a qualifier of "directly" or "indirectly," may either directly or indirectly reference or point to the thing. For example, a metadata value that points to or references data may do so directly by specifying the storage location itself of the data, or may do so indirectly by referencing or pointing to other metadata (e.g., in another data structure) that may specify the storage location itself of the data or reference/point to other metadata (and so on) that ultimately specifies the storage location itself of the data.

As used herein, "snapshot data" is data that is persisted (e.g., stored) exclusively for use by snapshots to reflect the state of LSUs at the different points in time represented by the snapshots. For example, in some snapshot technologies, such as those described in Jaganathan and Tobin, current LSU data may be shared by a snapshot of the LSU initially, at the time at which the snapshot is taken. That is, after a snapshot is taken, but before any write operations to any LSEs of the LSU following the snapshot being taken, the snapshot metadata points to the same data pointed to by the LSU metadata representing the current state of the LSU. It is only after a first write to an LSE of the LSU following the taking of the snapshot that the snapshot data and the LSU data may diverge, resulting in the moving of the old data for the LSE to a new location (e.g., from a pool of storage reserved for snapshots), and an updating of the snapshot metadata to point to the data at the new location. This old data pointed-to by the snapshot metadata is now snapshot data that is exclusively used for snapshots, as opposed to the new data of the write operation, the location of which is now pointed to by current LSU metadata for the LSE, and also may be shared by future snapshots. Examples of data structures for storing LSU metadata are described in more detail herein.

During Phase 2, A1 may determine, for each R1 LSE having a logged outstanding write request, whether the R1 LSE metadata points to the current data of the R1 LSE, or points to snapshot data of the R1 LSE. If it is determined that the R1 LSE metadata points to the current data of the R1 LSE, then it may be determined whether the remote replication of any write operations for the R1 LSE are still pending. If so, Phase 2 processing of any outstanding write requests of R1, or perhaps only the LSE in particular, may be suspended until acknowledgements are received from A2 that the outstanding write requests for the R1 LSE have been completed (e.g., cached or stored on a physical storage device) on A2. In some embodiments, rather than waiting for the replication-pending writes of the LSE to complete, it may be may recorded (e.g., in a data structure) that the R1 LSE has replication-pending writes, and the Phase 2 processing of other R1 LSEs on A1 may continue. A list of R1 LSEs having replication-pending writes may be maintained on A1. After Phase 2 processing for the last R1 LSE not having replication-pending writes is completed, the Phase 2 processing may return to the R1 LSEs having replication-pending writes, for example, by accessing the list of replication-pending LSEs. Returning to the list of R1 LSEs having replication-pending writes may be done in consideration that the replication-pending write operations of the LSEs may have been replicated to R2 (as part of typical replication processing) during the time that has elapsed since last checked, so that the previously noted replication-pending writes have now been acknowledged by A2 as complete on A2. For any R1 LSE that still has a replication-pending write, the process may move on to the next R1 LSE of the list and attempt further Phase 2 processing of the R1 LSE, and repeat the foregoing process until there are no longer any replication-pending LSEs.

For each R1 LSE having an outstanding write request, the outstanding write operation of the request may be communicated to A2 if: a) it was determined that the $SS1_1$ metadata of the R1 LSE points to snapshot data of the R1 LSE; or b) it was determined that the R1 LSE metadata points to the current data of the R1 LSE and either: i) it is determined that there are no replication-pending write requests for the R1 LSE, or ii) after acknowledgements are received that the replication of any such write requests are complete on A2. The communication of the outstanding write operation may be referred to herein as an outstanding write instruction ("OWI")) from A1 to A2, and may specify any of: an ID of $SS1_1$; an ID of the R1 LSE; an ID of R2; and an indication of whether the value of the R1 LSE metadata for $SS1_1$ is the current value of R1 LSE, i.e., points to the storage location of the current value of R1 LSE, or is a value of snapshot data for R1 LSE for $SS1_1$, i.e., points to a location of snapshot data specific to R1 LSE for $SS1_1$.

The $SS1_2$ metadata of an LSE of R2 corresponding to the R2 LSE may be in one of three general R2 LSE states when Phase 2 begins: a) pointing to the current data of the R2 LSE; or b) pointing to snapshot data of the R2 LSE, which is the same as snapshot data of the R1 LSE sent by A1; or c) pointing to snapshot data of the R2 LSE, which is different than snapshot data of the R1 LSE sent by A1 (and thus incorrect). The storage system A2 may determine: the R1 LSE state from the OWI sent by A1, the R2 LSE state, and whether to modify $SS1_2$ snapshot data and snapshot metadata based at least in part on the R1 LSE state and the R2 LSE state, as described in more detail elsewhere herein.

While embodiments herein discuss the remote replication of snapshots from a single LSU, R1 to another LSU R2, it should be appreciated that the invention is not so limited, as the techniques and mechanisms described herein may be applied to remotely replicating snapshots of multiple LSUs on A1 to multiple LSUs on A2 and or other secondary or tertiary storage systems. Further, while embodiments herein discuss the remote replication of a single snapshot from R1 to R2, it should be appreciated that the invention is not so limited, as the techniques and mechanisms described herein may be applied to remotely replicating multiple snapshots of R1 to R2, including multiple snapshots taken during a same consistency window on A1.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a switching fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more front-end adapters ("FAs") 21a-n (e.g., directors configured to serve as FAs), which also are referred to herein as host adapters ("HAs"). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing I/O operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
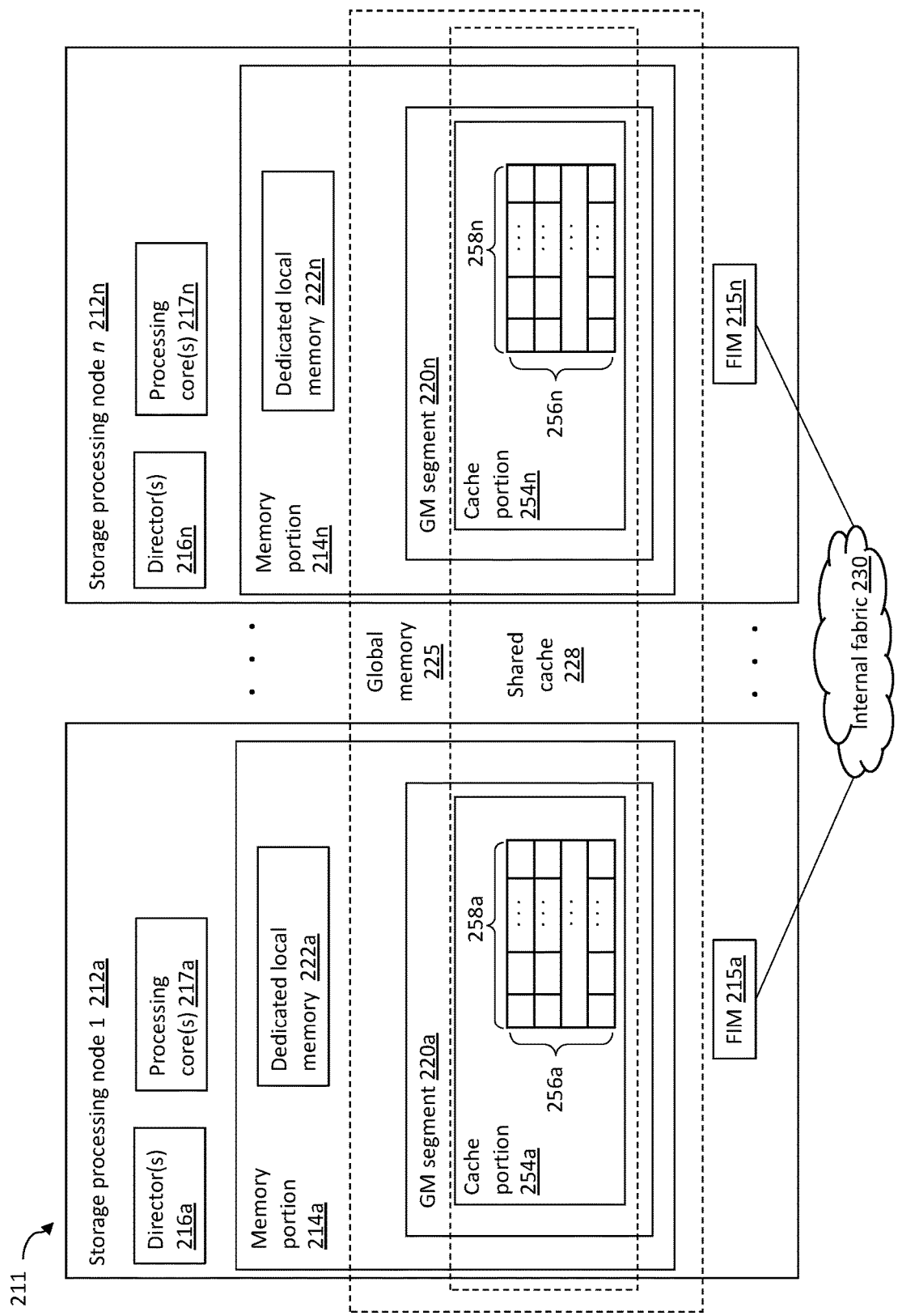
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The switching fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing I/O operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220*a-n*, may be used to store I/O data (e.g., for servicing read and write operations).

Each cache portion 254*a-n* may be a portion of a shared cache 228 (e.g., cache 28) distributed across the processing nodes 212*a-n*, where the shared cache 228 may be considered a part of the GM 225. The cache portion 254*a-n* may include a plurality of cache slots 256*a-n*, each cache slot including one or more (e.g., 16) sections 258*a-n*. Each cache slot 256*a-n* may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20*a*, including data structures to manage the mapping of LSUs and locations thereon to physical storage devices and locations thereon. Such data structures may be stored in any of memory 26, including GM 25*b* and memory 25*a*, GM segment 220*a-n* and/or dedicated local memories 22*a-n*. Thus, storage system 20*a*, and storage system 620*a* described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
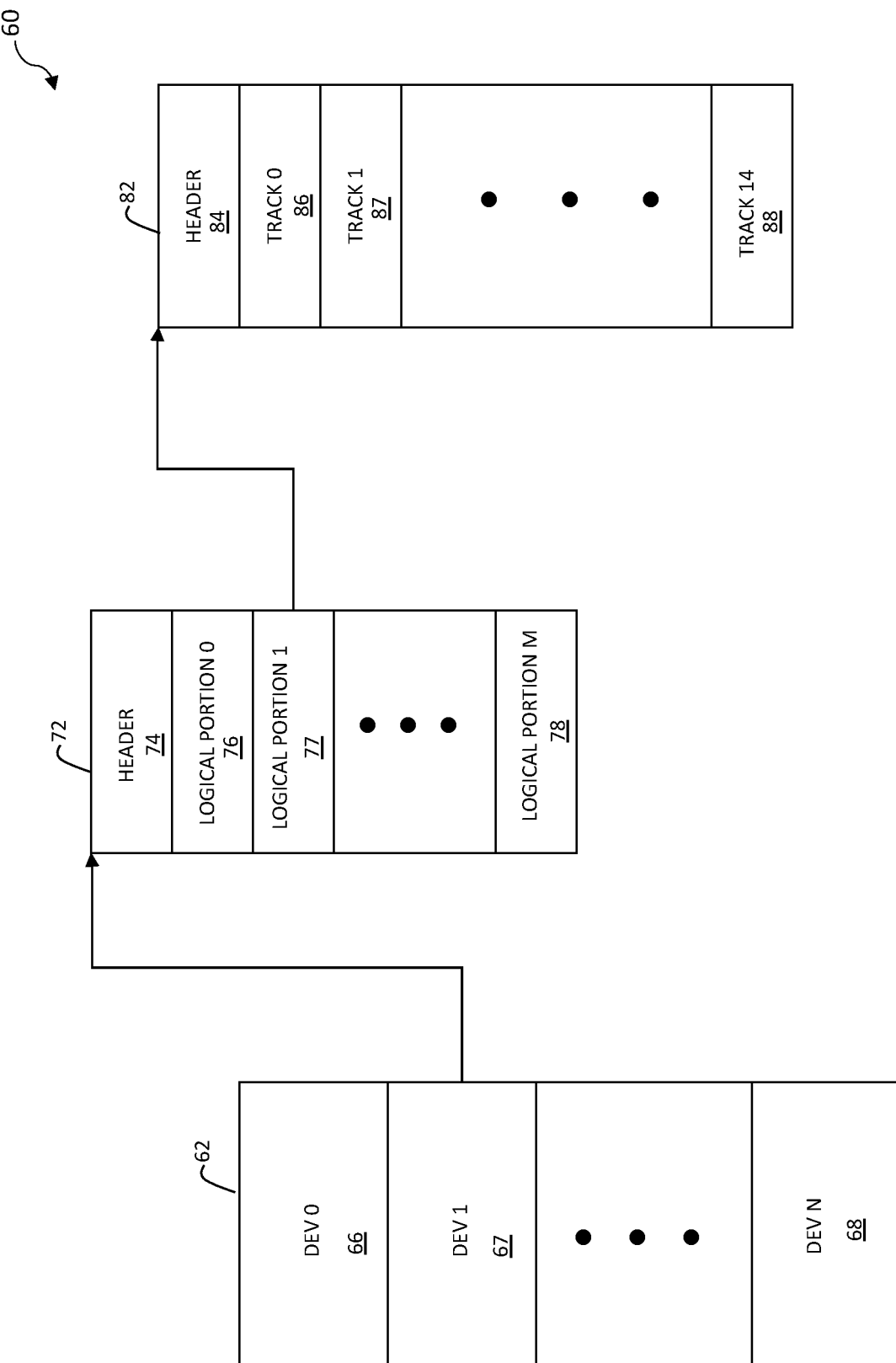
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20*a*) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache. In some embodiments, each entry 86-88 may specify a version of the data stored on the track. A sub-element of an LSU, for example, a logical storage portion or track, may be referred to herein as a logical storage element (LSE).

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the logical data portion maintains the null pointer that was written at initialization.

FIG. 5 is a block diagram illustrating an example of a data structure 300 for mapping LSU tracks (e.g., thin device tracks) to cache slots of a cache. Data structure 300 may be referred to herein as a "cache slot table." The cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of the cache slot table 300, a column 312 may specify (e.g., using a cache slot ID and/or memory address) a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

Each of the entries 302 of the cache slot table also may specify: cache lock information in a column 314, replication information in a column 316, and other cache information in a column 318. The cache lock information may indicate whether or not the cache slot represented by the entry is locked, and if locked, the process ID of the entity that owns the lock. The entity may be, for example: an FA executing a write operation from a host; an RA replicating a write operation from the cache slot to R2, or replicating a write operation from R2 into the cache slot; or a BE de-staging data in the cache to a physical storage device or reading data from a PSD into the cache slot. The replication information may specify information relative to replication, for example, the replication cycle number currently associated with the cache slot, the replication (e.g., RDF) group associated with the cache slot (i.e., associated with the R1 track currently mapped to the cache slot, a type of cache slot (e.g., normal or duplicate), and other information. A normal cache slot type may indicate that a cache slot is handled per normal processing, i.e., when there is not a cache lock conflict resolution involved, for example, as described herein. A duplicate cache slot type may indicate that a cache slot is a duplicate of a cache slot used to resolve a cache slot lock conflict, which is not handled in the standard manner, but rather, is handled differently to resolve the cache slot lock, for example, as described herein.

The other cache slot information in the column 318 may include information about the status of writes to one or more portions (e.g., sectors) of the R1 track corresponding to the cache slot, e.g., whether the write is pending or complete. Completing the write may include writing it to a PSD on A1 (e.g., de-staging it from cache) and receiving acknowledgement from A2 (and perhaps other remote storage systems to which the LSU in question is being replicated) that the replicated data is committed on A2 (and other remote storage systems if any).

It should be appreciated that the cache slot table 300 may be used for purposes independent of any LSU tracks mapped thereto. That is, a cache slot ID or memory address in cache pointer column 312 may be used as a key to access, and modify as necessary, cache metadata about a cache slot, including any of the information in columns 314, 316 and/or 318.

The tables 62, 72, 72', 82 and 300 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n also may use and locally store portions of the tables 62, 72, 72', 82 and 300. Other data structures may be stored in any of GM 25b, memory 25a, GM segment 220a-n and/or dedicated local memories 22a-n.

Any of the information contained in any of the data structures 62, 72, 72', 82 and 300, for example, the information included in the LSU track table 82 and the cache slot table 300, may be combined in a single data structure, which may be referred to herein as an LSU track metadata table. In some embodiments, a cache slot table 300 may be maintained separately from an LSU track metadata table. In such embodiments, the entries 302 of the cache slot table 300 may be indexed/keyed by a cache slot ID and/or memory address in the column 312, may identify the LSU track currently mapped to the slot (if any) in columns 304 and 306, may include cache lock info in the column 314, and may include other cache info. In such embodiments, the LSU track table may include: information about the LSU track described in relation to the LSU track table 82; replication information described in relation to the column 316; the cache slot (of any) currently mapped to the LSU track; and any other information described in relation to the cache slot table 300.

In some embodiments of the invention, data replication may be employed between two or more storage systems on a storage network, which may before referred to herein as "remote data replication" to distinguish it from "local data replication," which may be used herein to refer to data replication performed within a single storage system. Referring back to FIG. 1, the RA (remote adapter) 40 may be configured to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA (e.g., RA 40) may include hardware including a processor used to facilitate communication between data storage systems, such as between two data storage systems. The RA may be used with the Dell EMC™ Symmetrix® Remote Data Facility (SRDF®) products. Dell EMC™ SRDF® is a family of products that facilitates the data replication from one data storage array to another through a Storage Area Network (SAN) or and IP network. Dell EMC™ SRDF® logically pairs a device or a group of devices from each array and replicates data from one to the other synchronously or asynchronously. Generally, the Dell EMC™ SRDF® products are one example of commercially available products that may be used to provide functionality of a remote data facility (RDF) for use in an embodiment in connection with techniques herein.

Figure 6A:
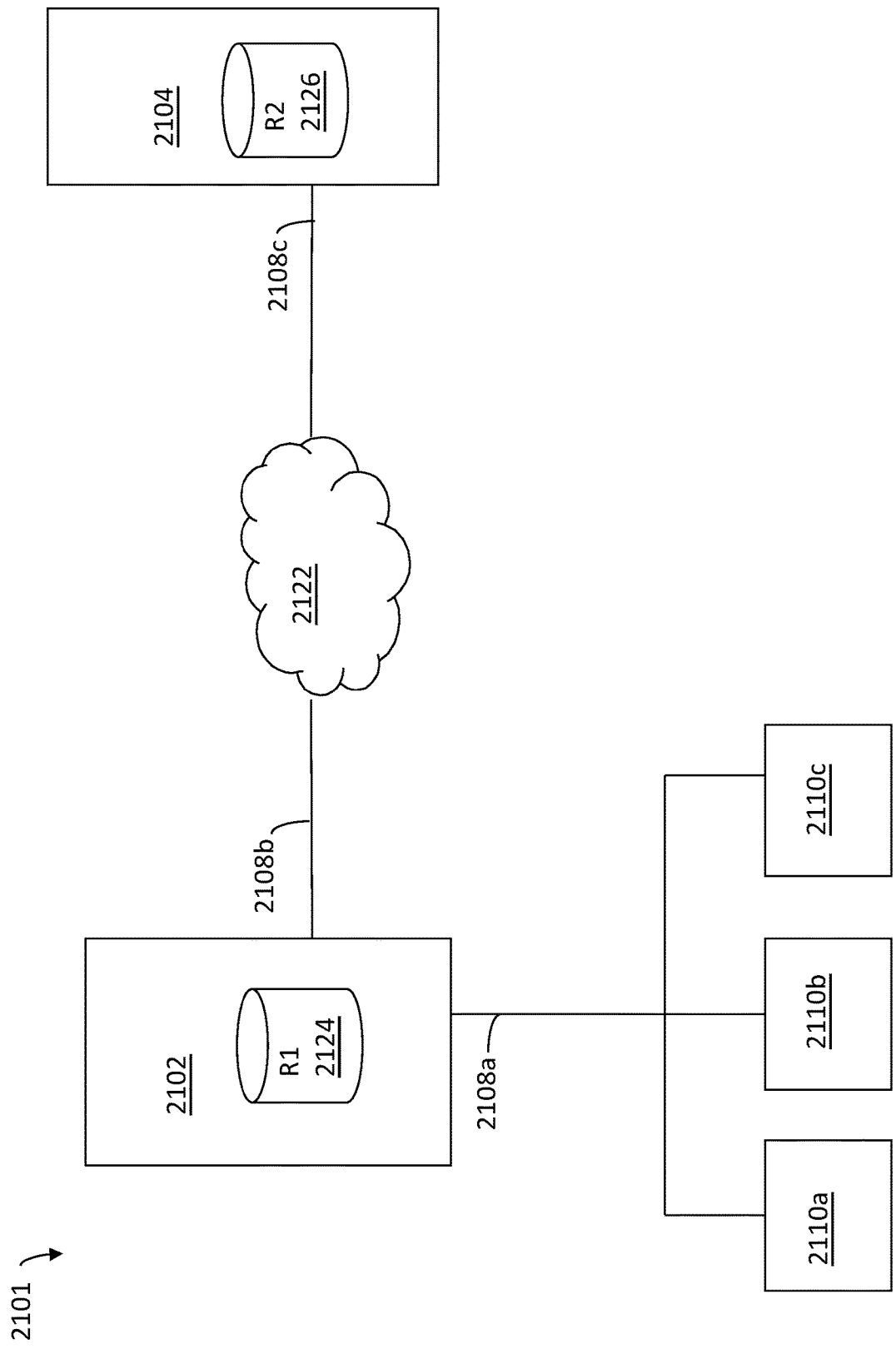
FIGS. 6A-6C are examples of various embodiments of components configured for replication, according to embodiments of the invention.

Referring to FIG. 6A, shown is an example of an embodiment of a system 2101 that may be used in connection with the techniques described herein. It should be noted that the embodiment illustrated in FIG. 6A presents a simplified view of some of the components illustrated in FIG. 1, for example, including only some detail of the data storage system 20a for the sake of illustration.

Included in the system 2101 are data storage systems 2102 and 2104 and hosts 2110a, 2110b and 1210c. The data storage systems 2102, 2104 may be remotely connected and communicate over network 2122, such as the Internet or other private network, and facilitate communications with the components connected thereto. Hosts 2110a, 2110b and 2110c may perform operations to data storage system 2102 over connection 2108a. The hosts 2110a, 2110b and 2110c may be connected to the data storage system 2102 through connection 2108a which may be, for example, network or other type of communication connection. Although not illustrated, the hosts 2110a-2110c also may be directly connected to a network such as the Internet.

The data storage systems 2102 and 2104 may include one or more LSUs (e.g., logical storage devices). In this example, data storage system 2102 includes R1 2124 and data storage system 104 includes R2 2126. LSUs R1 and R2 may be referred to herein simply as "R1" and "R2." Both of the data storage systems may include one or more other logical and/or physical devices. Data storage system 2102 may be characterized as local with respect to hosts 2110*a*, 2110*b* and 2110*c*. Data storage system 104 may be characterized as remote with respect to hosts 2110*a*, 2110*b* and 2110*c*. Each of R1 and R2 may be configured as LUNs.

The host 2110*a* may issue a command, such as to write data to R1 of data storage system 2102. In some instances, it may be desirable to copy data from the R1 to another second LSU, such as R2, provided in a different location so that if a disaster occurs that renders R1 inoperable, the host (or another host) may resume operation using the data of R2. Such a capability is provided, for example, by the Dell EMC™ SRDF® products. Communication between LSUs on different data storage systems using Dell EMC™ SRDF® is described, for example, in U.S. Pat. Nos. 5,742,792, 5,544,347, and 7,054,883, all of which are incorporated by reference herein. With Dell EMC™ SRDF®, a user may denote a first LSU, such as R1, as a master LSU and a second LSU, such as R2, as a slave LSU. Other incarnations of Dell EMC™ SRDF® may provide a peer to peer relationship between the local and remote LSUs. In this example, the host 2110*a* interacts directly with the R1 of data storage system 2102, but any data changes made are automatically provided to the R2 LSU of data storage system 2104 using Dell EMC™ SRDF®. In operation, the host 2110*a* may read and write data using the R1 volume in 2102, and Dell EMC™ SRDF® may handle the automatic copying and updating of data from R1 to R2 in data storage system 2104.

As illustrated in connection with other figures herein, data storage system 2102 may have one or more RAs included therein to facilitate remote connections to the data storage system 2104. Communications between storage system 2102 and 2104 may be made over connections 2108*b*,2108*c* to network 2122. Data storage system 2104 may include one or more RAs for use in receiving the communications from the data storage system 2102. The data storage systems may communicate, for example, over Gigabit Ethernet connections supporting TCP/IP traffic. The Dell EMC™ SRDF® replication functionality may be facilitated with the RAs provided at each of the data storage systems 2102 and 2104. Performing remote data communications using SRDF® over a TCP/IP network is described in more detail in U.S. Pat. No. 6,968,369, Nov. 22, 2005, Veprinsky, et al., "Remote Data Facility Over an IP Network," which is incorporated by reference herein. In connection with Dell EMC™ SRDF®, a single RDF link, connection or path may be between an RA of the system 2102 and an RA of the system 2104. As described in more detail below, techniques are described for use in transmitting data over an RDF link, such as I/O traffic including write data in connection with performing remote data replication over the RDF link between the systems 2102 and 2104.

An embodiment also may include the concept of a remote data facility (RDF) group in which one or more LSUs (e.g., LUNs) on a data storage system are associated with a particular group under the control of a single RA which services the LSUs included therein. Rather than have a single R1 LSU and a single R2 LSU, a grouping may be defined so that a source group of LSUs, such as on data storage system 2102, have corresponding target LSUs of a target group, such as LSUs on data storage system 2104. Devices in a source group may be mirrored in corresponding LSUs of a target group using Dell EMC™ SRDF® functionality.

Techniques herein may be used with Dell EMC™ SRDF®, or more generally any RDF, operating in one or more different supported modes. For example, such modes may include Dell EMC™ SRDF® operating in synchronous mode, asynchronous mode, or adaptive copy mode. For example, in connection with Dell EMC™ SRDF®, the host may issue a write to an R1 LSU in a first data storage system and the data change is propagated to the R2 LSU in a second data storage system. As discussed in U.S. Pat. No. 5,544, 347, Dell EMC™ SRDF® can be operated in either a synchronous mode or an asynchronous mode. When operating in the synchronous mode, the host does not consider a write I/O operation to be complete until the write I/O has been completed on both the first and second data storage systems. Thus, in synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 2102, 2104, it may be desirable to operate in a mode such as asynchronous to avoid host timeouts while the host awaits acknowledgement regarding completion of a host I/O.

Described in following paragraphs are techniques that may be used in connection with performing data replication in a synchronous manner such as Dell EMC™ SRDF® operating in an synchronous mode (Dell EMC™ SRDF®/ S). With synchronous mode data replication, a host 2110*a* may issue a write to the R1 LSU 2124. The primary or R1 data storage system 2102 may store the write data in its cache at a cache location and mark the cache location as including write pending (WP) data as mentioned elsewhere herein. The remote data replication facility operating in synchronous mode, such as Dell EMC™ SRDF®/S, may propagate the write data across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. Responsive to receiving this acknowledgement from the R2 data storage system 2104, the R1 data storage system 2102 may return an acknowledgement to the host 2110*a* that the write has been received and completed. Thus, generally, R1 LSU 2124 and R2 LSU 2126 may be logical devices, such as LUNs, configured as mirrors of one another. R1 and R2 LSUs may be, for example, fully provisioned LUNs, such as thick (i.e., not thin or virtually provisioned) LUNs, or may be LUNs that are thin or virtually provisioned logical devices.

When operating in asynchronous mode when processing a received write I/O operation from a host as noted above, the primary or R1 data storage system 2102 may store the write data in its cache at a cache location and mark the cache location as including write pending (WP) data as mentioned elsewhere herein. The write data may be propagated across an established RDF link (more generally referred to as a the remote replication link or link) such as over 2108*b*, 2122, and 2108*c*, to the secondary or R2 data storage system 2104 where the write data may be stored in the cache of the system 2104 at a cache location that is marked as WP. Once the write data is stored in the cache of the system 2104 as described, the R2 data storage system 2104 may return an acknowledgement to the R1 data storage system 2102 that it has received the write data. With asynchronous mode, once the write data is stored in the cache of the local or R1 system 2102 and marked as WP, an acknowledgement regarding completion of the host write may be sent to the host 2110a by the system 2102. Thus, in asynchronous mode the system 2102 is not required to wait to receive the acknowledgement from the R2 data storage system 2104 prior to sending the acknowledgement to the host regarding completion of the write operation.

Figure 6B:
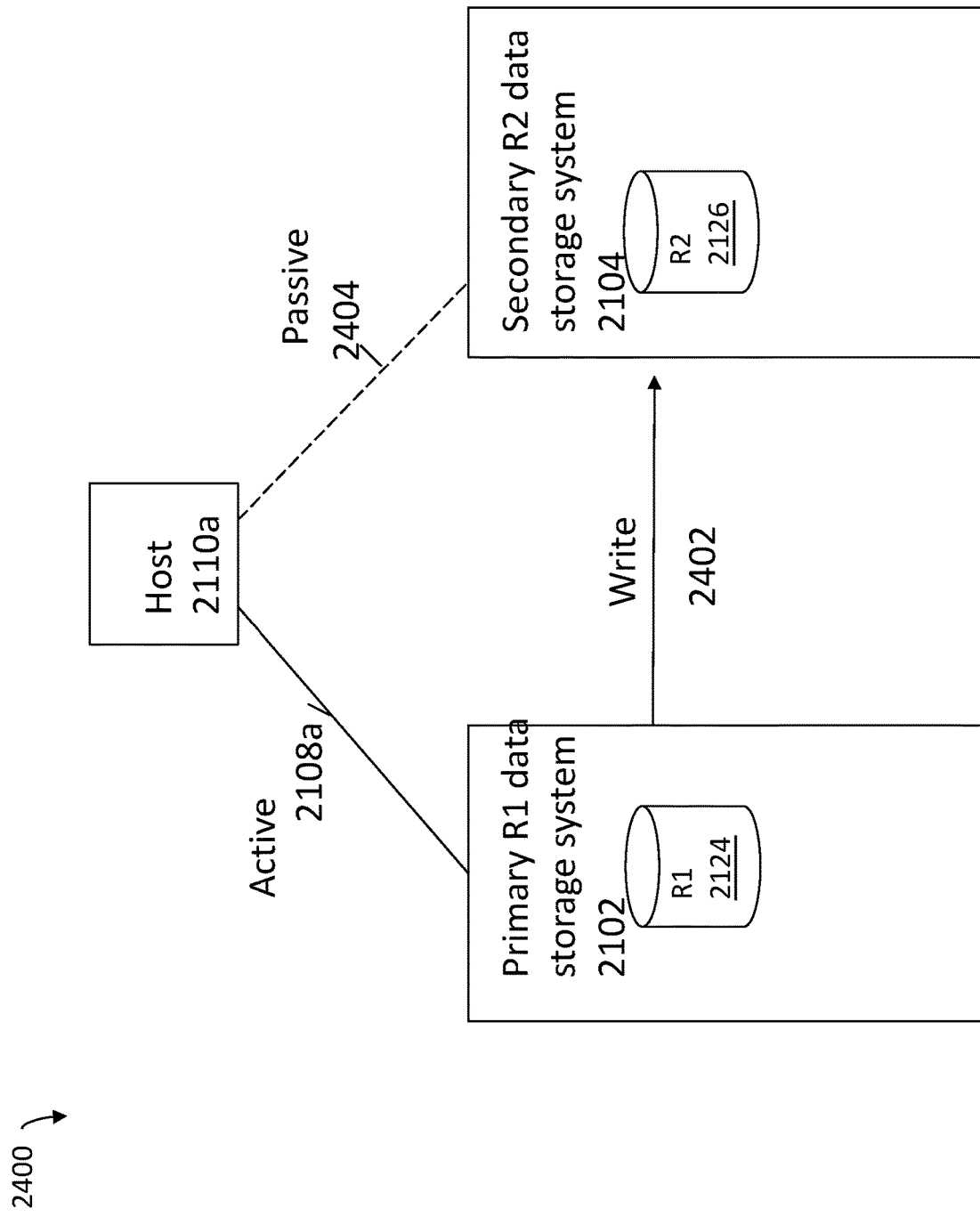

With reference to FIG. 6B, shown is a further simplified illustration of components that may be used in an embodiment in accordance with techniques herein. The example 2400 is simplified illustration of components as described in connection with FIG. 2. Element 2402 generally represents the replication link used in connection with sending write data from the primary R1 data storage system 2102 to the secondary R2 data storage system 2104. Link 2402, more generally, may also be used in connection with other information and communications exchanged between 2101 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 6B may also be referred to herein as an active-passive configuration such as may be used with synchronous replication and other supported replication modes where the host 2110a has an active connection or path 2108a over which all I/Os are issued to only the R1 data storage system. The host 2110a may have a passive connection or path 2404 to the R2 data storage system 2104. In the configuration of 2400, the R1 LSU 2124 and R2 LSU 2126 may be configured and identified as the same LSU, such as LSU A, to the host 2110a. Thus, the host 2110a may view 2108a and 2404 as two paths to the same LSU A where path 2108a is active (over which I/Os may be issued to LSU A) and where path 2404 is passive (over which no I/Os to the LSU A may be issued). Should the connection 2108a and/or the R1 data storage system 2102 experience a failure or disaster whereby access to R1 2124 configured as LSU A is unavailable, processing may be performed on the host 2110a to modify the state of path 2404 to active and commence issuing I/Os to the R2 LSU configured as LSU A. In this manner, the R2 LSU 2126 configured as LSU A may be used as a backup accessible to the host 2110a for servicing I/Os upon failure of the R1 LSU 2124 configured as LSU A.

It should be noted although only a single RDF link 2402 is illustrated, more generally any number of RDF links may be used in connection with replicating data from systems 2102 to system 2104 in connection with techniques herein.

Figure 6C:
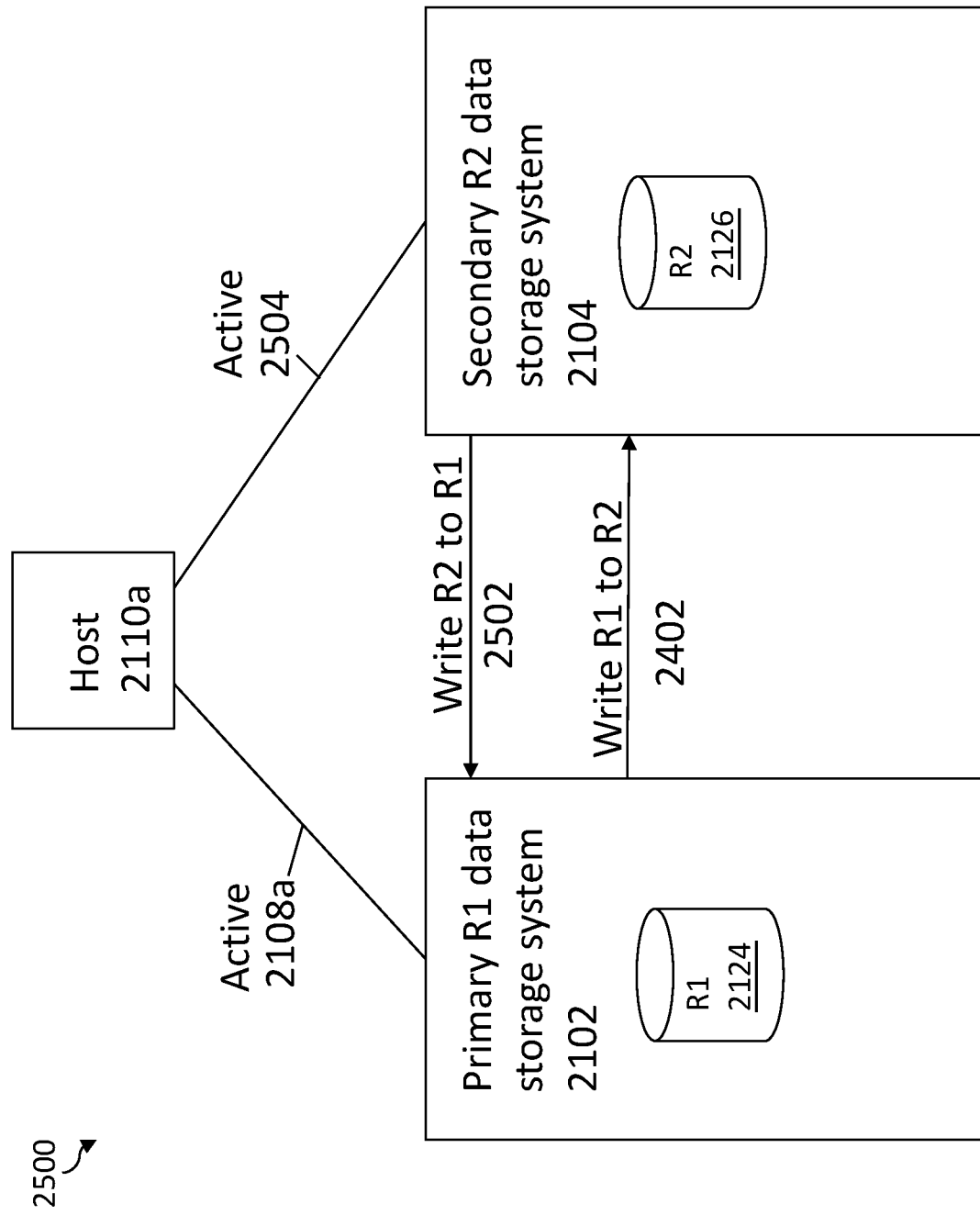

Referring to FIG. 6C, shown is another example configuration of components that may be used in an embodiment in accordance with techniques herein. The example 2500 illustrates an active-active configuration as may be used in connection with synchronous replication in at least one embodiment in accordance with techniques herein. In an active-active configuration with synchronous replication, the host 2110a may have a first active path 2108a to the R1 data storage system and R1 LSU 2124 configured as LSU A. Additionally, the host 2110a may have a second active path 2504 to the R2 data storage system and R2 LSU 2126 configured as LSU A. From the view of the host 2110a, paths 2108a and 2504 appear as 2 paths to the same LSU A as described in connection with FIG. 6B with the difference that the host in the example 2500 configuration may issue I/Os, both reads and/or writes, over both of paths 2108a and 2504. The host 2110a may send a first write over path 2108a which is received by the R1 system 2102 and written to cache of the R1 system 2102 where, at a later point in time, the first write is de-staged from the cache of the R1 system 2102 to physical storage provisioned for the R1 LSU 2124 configured as LSU A. The R1 system 2102 also sends the first write to the R2 system 2104 over link 2402 where the first write is written to cache of the R2 system 2104, where, at a later point in time, the first write is de-staged from the cache of the R2 system 2104 to physical storage provisioned for the R2 LSU 2126 configured as LSU A. Once the first write is written to the cache of the R2 system 2104, the R2 system 2104 sends an acknowledgement over link 2402 to the R1 system 2102 that it has completed the first write. The R1 system 2102 receives the acknowledgement from the R2 system 2104 and then returns an acknowledgement to host 2110a over path 2108a that the first write has completed.

The host 2110a may also send a second write over path 2504 which is received by the R2 system 2104 and written to cache of the R2 system 2104 where, at a later point in time, the second write is de-staged from the cache of the R2 system 2104 to physical storage provisioned for the R2 LSU 2126 configured as LSU A. The R2 system 2104 also sends the second write to the R1 system 2102 over a second link 2502 where the second write is written to cache of the R1 system 2102, and where, at a later point in time, the second write is de-staged from the cache of the R1 system 2102 to physical storage provisioned for the R1 LSU 2124 configured as LSU A. Once the second write is written to the cache of the R1 system 2102, the R1 system 2102 sends an acknowledgement over link 2502 to the R2 system 2104 that it has completed the second write. Once the R2 system 2104 receives the acknowledgement from the R1 system (regarding completion of the second write), the R2 system 2104 then returns an acknowledgement to host 2110a over path 2504 that the second write has completed.

Thus, in the example 2500, the illustrated active-active configuration includes a first RDF R1-R2 LSU pairing configured for synchronous replication (from 2102 to 2104) where the R1 LSU is 2124 and the R2 LSU is 2126 whereby writes to LSU A sent over 2108a to system 2102 are stored on the R1 LSU 2124 and also transmitted to system 2104 over 2402. The write sent over 2402 to system 2104 is stored on the R2 LSU 2126. Such replication is performed synchronously in that the acknowledgement to the host write sent over 2108a is not acknowledged as successfully completed unless and until the write data has been stored in caches of systems 2102 and 2104.

In a similar manner, the illustrated active-active configuration of the example 2500 includes a second RDF R1-R2 LSU pairing configured for synchronous replication (from 2104 to 2102) where the R1 LSU is 2126 and the R2 LSU is 2124 whereby writes to LSU A sent over 2504 to system 2104 are stored on the LSU 2126 (now acting as the R1 LSU of the second RDF LSU pairing) and also transmitted to system 2102 over connection 2502. The write sent over 2502 is stored on the R2 LSU 2124. Such replication is performed synchronously in that the acknowledgement to the host write sent over 2504 is not acknowledged as successfully completed unless and until the write data has been stored in caches of systems 2102 and 2104.

Effectively, using the second RDF LSU pairing in the active-active configuration with synchronous replication as in FIG. 6C has the R2 system 2104 act as another primary data storage system which facilitates propagation of writes received at the data storage system 2104 to the data storage system 2102. It should be noted that although FIG. 6C illustrates for simplicity a single host accessing both the R1 LSU 2124 and R2 LSU 2126, any number of hosts may access one or both of the R1 LSU 2124 and the R2 LSU 2126.

Although only a single RDF link 2402 is illustrated in connection with replicating data from systems 2102 to system 2104 in connection with techniques herein, more generally any number of RDF links may be used. Although only a single RDF link 2502 is illustrated in connection with replicating data from systems 2104 to system 2102, more generally any number of RDF links may be used. Furthermore, although 2 RDF links 2402 and 2502 are illustrated, in at least one embodiment, a single RDF link may be used in connection with sending data from system 2102 to 2104, and also from 2104 to 2102.

In at least one embodiment in accordance with techniques herein, the FC protocol may be used in connection with communications (e.g., over the SAN including the RDF links) between the data storage system 2102 and 2104.

Asynchronous remote replication (ARR) may include a plurality of replication cycles for an LSU (R1) in a source (e.g.) storage system (A1), each cycle corresponding to a period of time and specifying any R1 tracks for which data was updated (e.g., by a write operation) during the period of time represented by the cycle. Each cycle may transition through four phases—two phases on A1 and two phases on a target (e.g., secondary) storage system A2. The two phases on A1 may include a capture phase during which the data updates for R1 are captured or collected, after which the cycle transitions into a transfer phase during which the updated data for R1 is transmitted from A1 to A2 to be updated for a target LSU (R2) on A2. On A2, the cycle begins in a receive phase during which the data updates transmitted as part of the transfer phase on A1 are received on A2, and transitions to an apply phase during which the data updates are applied to R2. Replication cycles for remote replication are described in greater detail in U.S. Pat. No. 9,880,946, "Data Transfer Techniques with Data Replication," to Benjamin Yoder et al., issued Jan. 30, 2018, the entire content of which is hereby incorporated by reference in its entirety.

In addition to employing remote replication techniques, embodiments of the invention may employ snapshot techniques, for example, as will now be described.

Figure 7A:
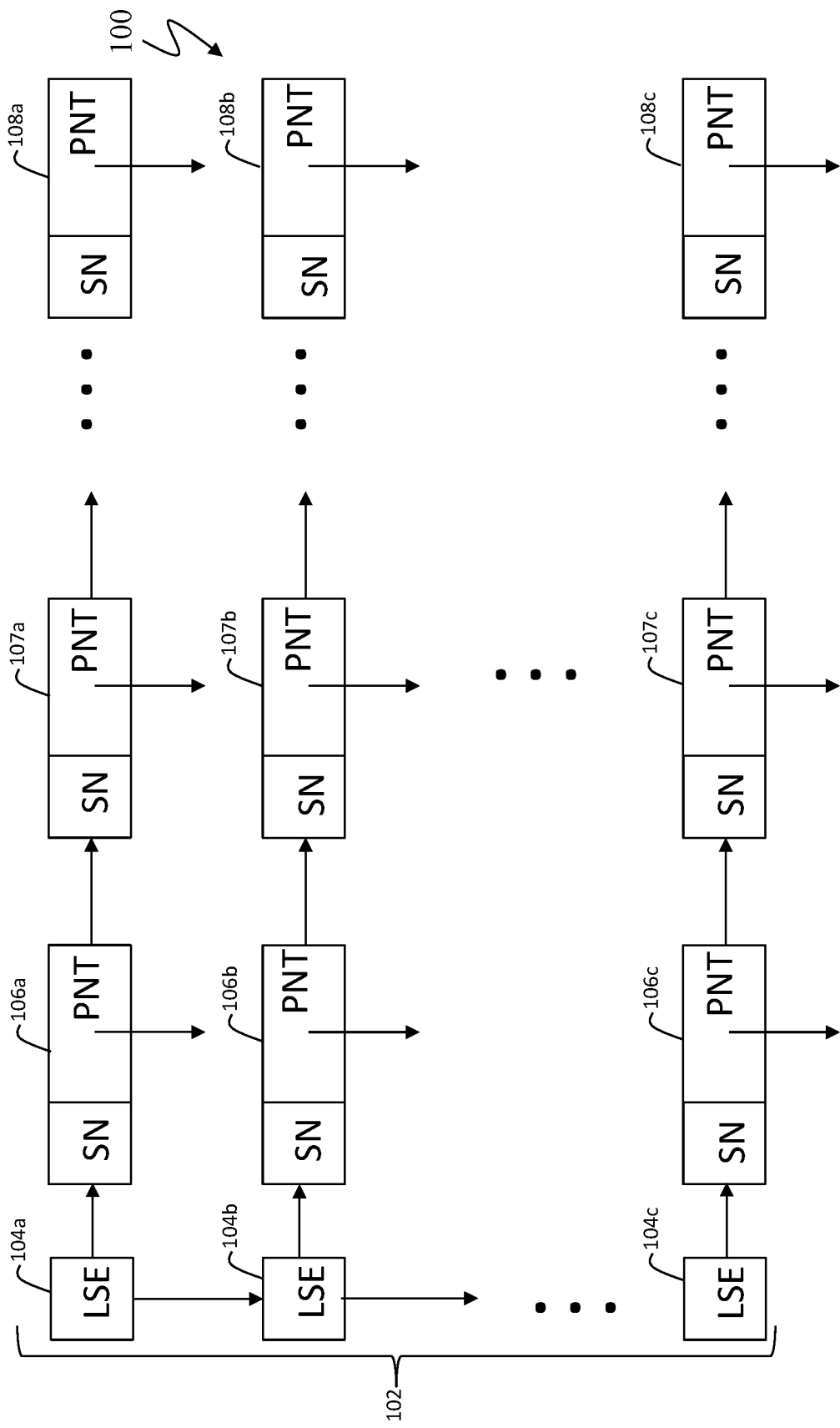
FIG. 7A is a diagram illustrating an example of a replication data pointer table, according to embodiments of the invention.

Referring to FIG. 7A, a replication data pointers (RDP) table 100 includes a first linked list 102 of a plurality of logical storage element (LSE) numbers 104a-104c, according to embodiments of the invention. A logical storage element or LSE may be any logically defined portion of an LSU, including any of: a logical data unit (as defined elsewhere herein), a track (as defined elsewhere herein), an extent or other type of portion. The RDP table 100 may be used to maintain data that is moved in connection with providing targetless snapshots, as described herein. Each of the LSE numbers 104a-104c may correspond to an LSE of an LSU. The LSU may be, for example, a conventional logical device with all of the LSEs having corresponding physical data storage allocated thereto or may be a thin device, as described in more detail elsewhere herein.

Each of the LSE numbers 104a-104c may correspond to one or more table entries that are maintained using an appropriate data structure, such as a linked list. The LSE number 104a may correspond to a plurality of table entries 106a-108a, the LSE number 104b may correspond to a plurality of table entries 106b-108b, and the LSE number 104c may correspond to a plurality of table entries 106c-108c. Note that, although the table 100 is illustrated with three LSE numbers 104a-104c each having three table entries, the table 100 may contain any number of LSE numbers each having any number of table entries. In some cases, which will become apparent from the additional discussion herein, it is possible for there to be no LSE number or corresponding table entries associated with a particular LSE of an LSU. Each of the table entries 106a-108c may include a sequence number and a pointer to storage, which are explained in more detail elsewhere herein.

Figure 7B:
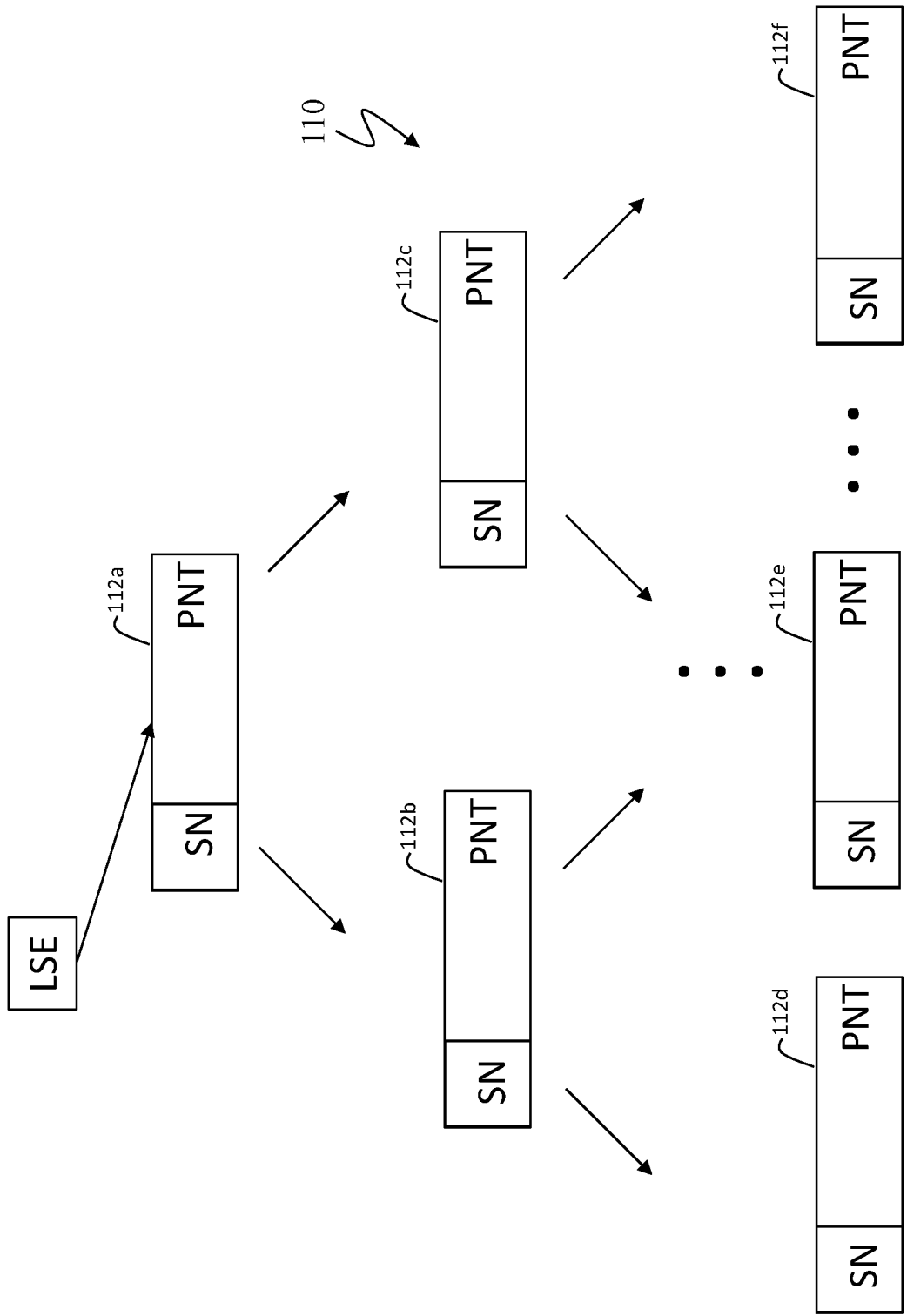
FIG. 7B is a diagram illustrating an example of a replication data pointer tree, according to embodiments of the invention.

Referring to FIG. 7B, a replication data pointers (RDP) tree 110 may include a plurality of table entries 112a-112f that each correspond to a particular LSE, according to embodiments of the invention. Each of the table entries 112a-112f may include a sequence number and a pointer to storage. The RDP tree 110 may correspond to one of the linked lists pointed to by one of the data pointers 104a-104c of the RDP table 100, discussed above. The sequence number and the pointer to storage may be similar to the sequence number and pointer to storage used in connection with the RDP table 100, and are described in more detail elsewhere herein. In an embodiment herein, the RDP tree 110 is a balanced binary tree ordered according to sequence number.

Referring to FIG. 8, a data pool 115 may include storage for data that is moved in connection with maintaining targetless snapshots, according to embodiments of the invention. Data stored in the data pool 115 may be pointed to by the pointers provided with the table entries 106a-108c or the table entries 112a-112f In some embodiments, the data pool 115 is provided in a single logical and/or physical location. In other embodiments, the data pool 115 may be distributed and/or may use more than one physical and/or logical data storage element. Providing data to the data pool 115 is discussed in more detail elsewhere herein.

Referring to FIG. 9, a snapshot table 120 may include a plurality of entries corresponding to particular snapshots, according to embodiments of the invention. Each of the entries may include a snapshot ID and a sequence number. The snapshot ID may be used to identify a particular snapshot and could be text (e.g., "Mar. 12, 2014, 8:00 am snapshot") or could be a token that is used by other software (not shown herein) to identify each of the snapshots. The sequence number provided with each of the snapshots may be used in connection with providing targetless snapshots and is described in more detail elsewhere herein.

Referring to FIG. 10, a sequence number table 130 is shown as having a plurality of entries, according to embodiments of the invention. Each of the entries of the table 130 may contain a sequence number, as described in more detail elsewhere herein. The table 130 may contain a single entry for each LSE number (or other appropriate data increment) of the LSU (e.g., logical device or thin device) for which targetless snapshots are being provided. Thus, for example, if there are one hundred LSEs in an LSU, there may be one hundred entries for sequence numbers in the table 130. Use of the sequence number table 130 and of sequence numbers is described in more detail elsewhere herein.

FIG. 11 is a flowchart illustrating an example of a method 1100 of performing operations in connection with performing targetless snapshots for a LSU, according to embodiments of the invention. In a step 1102, a global sequence number (associated with the LSU for which targetless snapshots are being provided) and the tables 100, 120, 130 that are used with targetless snapshots may be initialized. Note that the RDP tree 110 may be used in addition to or instead of the RDP table 100. In an embodiment herein, snapshot sequence numbers start at zero and are incremented by one for each snapshot, but of course in other instances it is possible to start at any number and increment or decrement by any amount. At the step 1102, the RDP table 100 (and/or the RDP tree 110) may be initialized to be empty (contain no entries), the snapshot table 120 may be initialized to be empty, the sequence number table 130 may be initialized so that each entry contains zero (the initial sequence number), and the global sequence number may be initialized to zero (the initial sequence number).

Following the step 1102 may be a step 1104 where the system waits for a snapshot to occur. A snapshot may be user initiated or may be automated to occur at specific times (e.g., every hour). Once a snapshot occurs, control may transfer from the step 1104 to a step 1106 where an entry corresponding to the snapshot may be created in the snapshot table 120. At the step 1106, the ID value may be provided to the new entry in the snapshot table 120 and the corresponding sequence number may be set to one greater than the current global sequence number. The ID value may include a user specified name that is to be associated with the sequence number provided to the entry. Following the step 1106 may be a step 1108 where the global sequence number is incremented. Following the step 1108, control may transfer back to the step 1104 to wait for the next snapshot to occur.

Figures 12, 13:
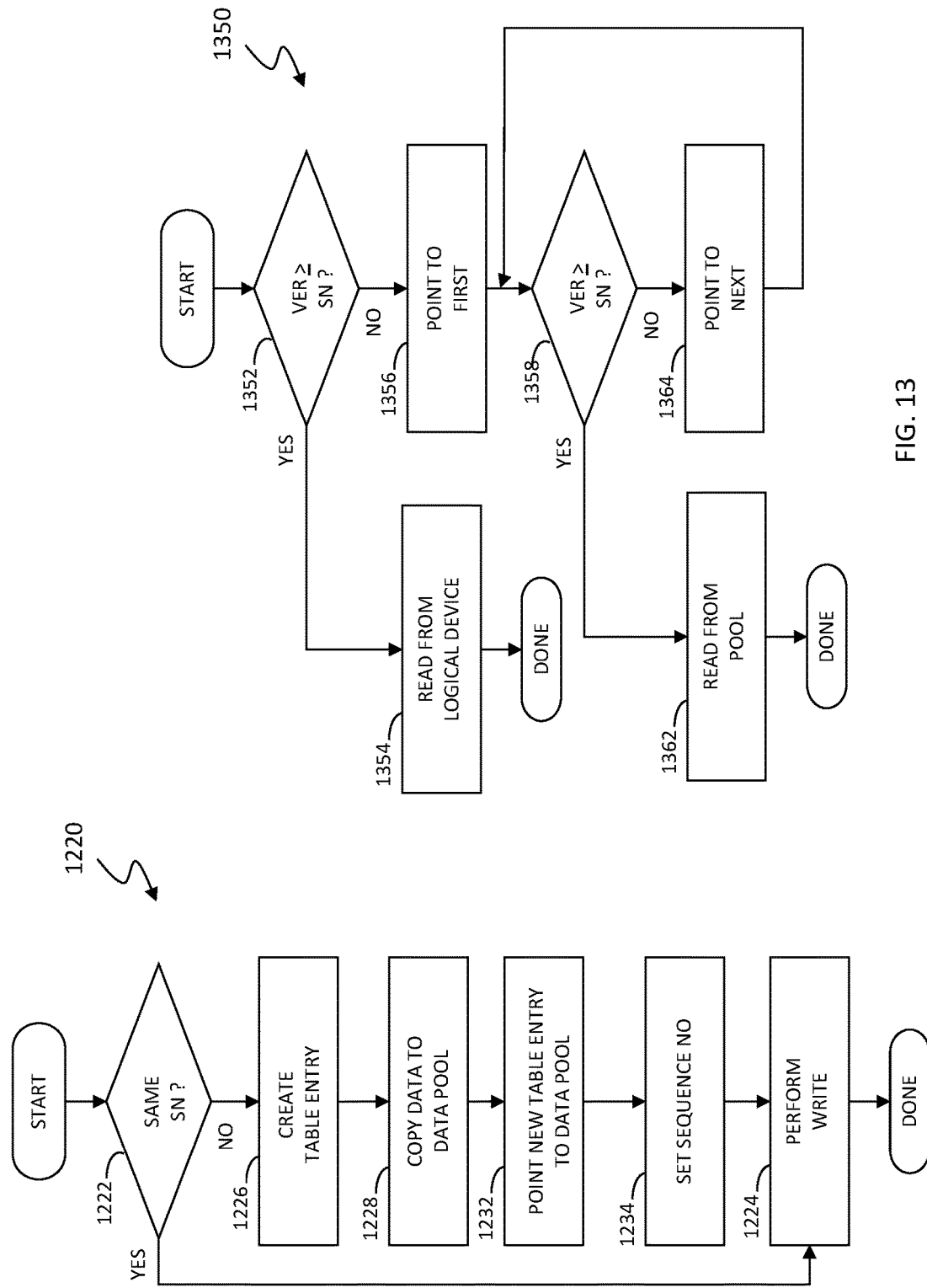
FIG. 12 is a flow diagram illustrating processing performed in connection with a write to a logical device after initiating a targetless snapshot, according to embodiments of the invention.
FIG. 13 is a flow diagram illustrating processing performed in connection with a read operation after initiating a targetless snapshot, according to embodiments of the invention.

FIG. 12 is a flowchart illustrating an example of a method 1220 performed in connection with a write operation to a LSU for which snapshots are being provided, according to embodiments of the invention. In a test step 1222, it may be determined if the global sequence number equals the sequence number associated with the LSE to which the write is being provided, which may be provided by the sequence number table 130. If so, then control may transfer from the test step 1222 to a step 1224 where the write operation may be performed in a usual fashion. No special processing may be performed in this case because the global sequence number being equal to the sequence number where the data is being written means that any snapshot data associated with that particular data section has already been protected (copied to the data pool 115, as described in more detail elsewhere herein). Following the step 1224, processing may be complete.

If it is determined in the step 1222 that the global sequence number does not equal the sequence number associated with the LSE to which the write is being performed (the global sequence number is greater), then control may transfer from the step 1222 to a step 1226 where an entry in the RDP table 100 may be created by placing the new entry in a linked list using the LSE number where the write is being performed on the LSU and using the sequence number for the source LSE (from the sequence number table 130). If the RDP tree 110 is used, then in the step 1226 a new entry may be created for the RDP tree 110. Following the step 1226 may be a step 1228 where data that is being overwritten is copied from the LSU to the data pool 115. Note that the step 1228 may be omitted in instances where the LSU is a thin device and the particular LSE is empty (e.g., the pointer for the LSE points to null). Note also that, in some cases data on the LSU may be cached, in which case the copy may be from the cache memory.

Following the step 1228 is a step 1232 where the pointer in the table entry created at the step 1226, described above, may be set to point to the data in the data pool 115 that was copied at the step 1228, described above, or to null in the case of a thin logical device with no data in the LSE. Following the step 1232 is a step 1234 where the sequence number for the entry in the sequence number table 130 may be set to the global sequence number, indicating that the corresponding data written to the LSU corresponds to the current global sequence number. Following the step 1234 may be the step 1224, discussed above, where the write operation to write the new data to the device may be performed. Following the step 1224, processing may be complete.

FIG. 13 is a flowchart illustrating an example of a method 1350 of processing performed in connection with reading different versions from different snapshots of data on the LSU, according to embodiments of the invention. In a step 1352, it may be determined if a sequence number associated with a desired version (VER in flow diagram 1350) is greater than or equal to a version number from the sequence number table (SNT in the flow diagram 1350). For example, if it was desired to read a version of data associated with a particular snapshot (e.g., "8:00 am on Mar. 12, 2014") having a sequence number X, then the test at the step 1352 may compare X with an entry in the sequence number table for the LSE of interest containing data being read, which may be provided in the sequence number table 130. If it is determined in the step 1352 that the sequence number of the desired version is greater than or equal to a version number from the sequence number table corresponding to the data being read, then data on the LSU was written prior to the time of the snapshot, and control may transfer from the step 1352 to the step 1354 where the data is read from the LSU. Note that this also may occur when it is desired to read current data from the LSU since data on the logical volume should always be the latest version. Following the step 1354, processing may be complete.

If it is determined at the step 1352 that the sequence number of the desired version is not greater than or equal to a version number from the sequence number table corresponding to the data being read, then data on the LSU was written after the time of the snapshot and the desired data is in the data pool 115, and control may transfer from the step 1352 to a step 1356 where an iteration pointer may be set to point to a first item in a list of items in the RDP table 100. The iteration pointer may be used to traverse a list of pointers for a LSE corresponding to the data being read. For the explanation herein, it may be assumed that the list of pointers is arranged with the most recently added table entry (having the highest sequence number) being first in the list, followed by the next most recently added table entry (having the second highest sequence number), etc. Generally, the iteration pointer may iterate through table entries for a specific LSE from highest sequence number to lowest sequence number. Note that, in instances where the RDP tree 110 is used, the iteration pointer may be set to point to the top of the RDP tree 110 and is used to traverse the RDP tree 110.

Following the step 1356 may be a test step 1358 where it may be determined if a sequence number associated with the desired version is greater than or equal to a version number associated with the table or tree entry indicated by the iteration pointer, similar to the test at the step 1352, discussed above. If so, then control may transfer from the test step 1358 to a step 1362 where data may be read from the data pool 115 according to the data pointer of the RDP table or RDP tree entry indicated by the iteration pointer. Following the step 1362, processing may be complete. Otherwise, if it is determined at the step 1358 that the sequence number associated with the desired version is not greater than or equal to the version number associated with the table or tree entry indicated by the iteration pointer, then control may transfer from the step 1358 to a step 1364 where the iteration pointer is set to point to a next table or tree entry. Note that the final item of the table or tree entries may have a sequence number of zero so that, eventually, the test at the step 1358 will cause the step 1362 to be executed.

In some instances, it is possible to maintain written data in memory (e.g., in a cache database in the global memory 26). Version information may be maintained with the written data in memory to facilitate eventually moving the data to the LSU while providing targetless snapshots as described herein. The data may be moved using a background process. Memory may be employed in this manner as described in the Jaganathan patent.

In some embodiments of the invention, a first LSU (R1) on a first storage system (A1), which may be considered a primary storage system, may be remotely replicated to a second LSU (R2), which may be referred to herein as a replica LSU, on a second storage system (A1), which may be considered a secondary storage system.

Figure 14:
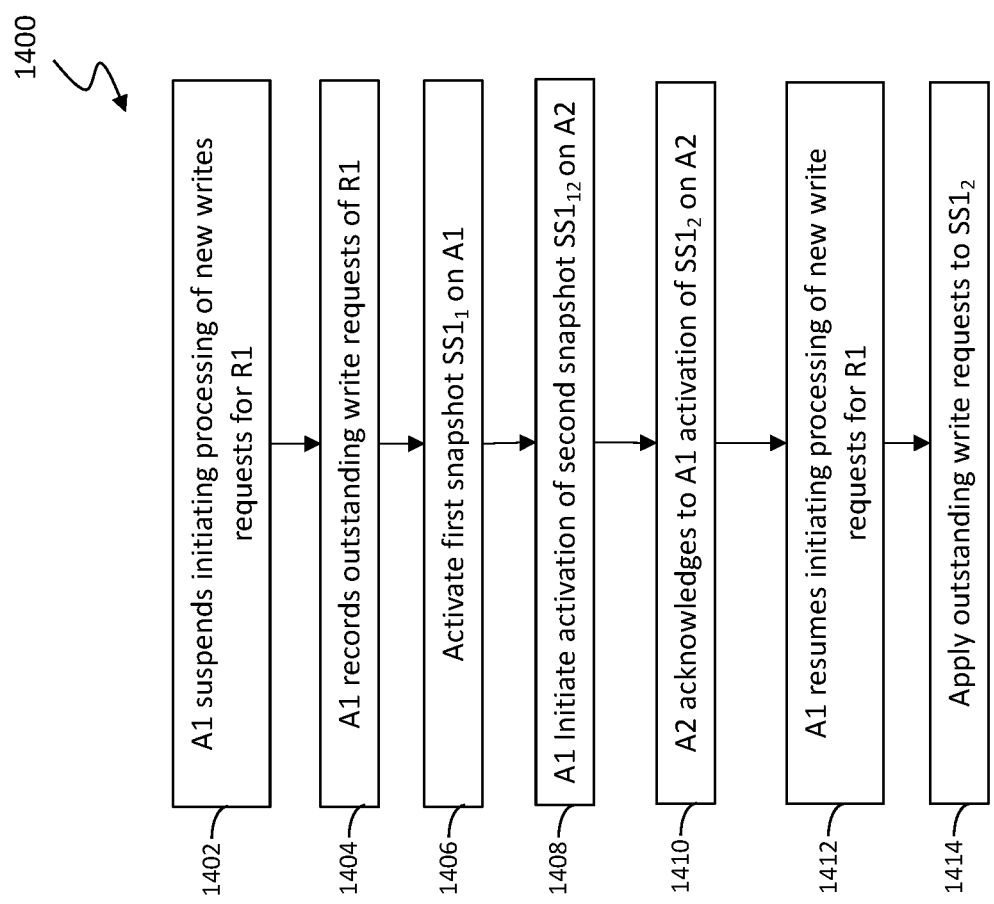
FIG. 14 is a flow diagram illustrating an example of a method of logging write operations for remote replication of a snapshot, according to embodiments of the invention.

FIG. 14 is a flow diagram illustrating an example of a method 1400 of logging write operations for remote replication of a snapshot, according to embodiments of the invention. Other embodiments of a method of logging write operations for remote replication of a snapshot, for example, variations of the method 1400, are possible and are intended to fall within the scope of the invention. One or more components of A1 and A2, for example, one or more of the directors 37*a-n* or directors 216*a-n* described in more detail in relation to FIGS. 1 and 2 may be configured to collectively implement the method 1400.

In a step 1402, A1 may suspend initiating processing of new write requests from any host system, for example, starting at the commencement of a consistency window at a time, T1. During the consistency window, A1 may record any write operations of write requests of R1 that were outstanding at the time T1 (and other LSUs) in a step 1404. In a step 1406, outstanding write requests of R1 may be recorded, for example, in a data structure 1500 illustrated in FIG. 15.

Figure 15:
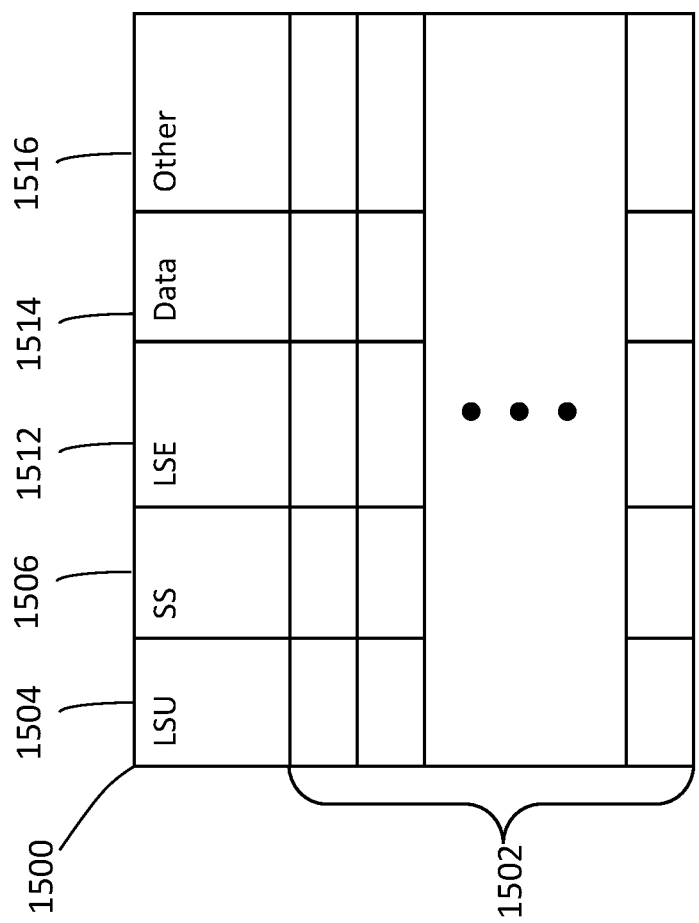
FIG. 15 is a block diagram illustrating an example of a data structure for logging write operations for remote replication of a snapshot, according to embodiments of the invention.

FIG. 15 is a block diagram illustrating an example of a data structure 1500 for logging write operations (e.g., of outstanding write requests) for remote replication of a snapshot, according to embodiments of the invention. Other embodiments of a data structure for logging write operations for remote replication of a snapshot, for example, variations of the data structure 1500, are possible and are intended to fall within the scope of the invention. The data structure 1500 may be referred to herein as an outstanding write log, and may be implemented in memory 26, e.g., global memory 25*b*.

The outstanding write log 1500 may include a plurality of entries 1502, where each of the plurality of entries 1502 may represent an outstanding write request. Each entry may include: an LSU ID of the LSU corresponding to the represented outstanding write request in an LSU column 1504; a snapshot ID of the snapshot corresponding to the represented outstanding write request in a snapshot (SS) column 1506; an LSE ID of the LSE specified by the represented outstanding write request in an LSE column 1512; a data value specified by the represented outstanding write request in a data column 1514; and other information corresponding to the represented outstanding write request in one or more other information columns 1516.

In some embodiments, the entries 1502 may be indexed by LSU ID, snapshot ID and/or LSE ID. One or more other data structures, including other indexes, may be created from the outstanding write log 1500. Other types of data structures may be used to log or otherwise store outstanding write information, for example, object-oriented data structures, linked lists or trees.

The outstanding write log may include outstanding write operations for multiple LSUs on a storage system (e.g., A1), and may include outstanding write operations for several snapshots of a same LSU, for example, several snapshots taken during a same consistency window for an LSU.

Returning to FIG. 14, a first snapshot, $SS1_1$, may be taken on A1 in a step 1406, and A1 may initiate taking a second snapshot, $SS1_2$, which is intended to be a replica of $SS1_1$, on A2. A1 may initiate $SS1_2$ by sending an instruction to A2, where the instruction may include information about $SS1_1$, including the $SS1_1$ ID. In response to receiving the instruction, A2 may take $SS1_2$, and acknowledge to A1 the activation of $SS1_2$ ID, which may include information about $SS1_2$, including the $SS1_2$ ID. At least initially, $SS1_2$ may not be an exact replica of $SS1_1$ given that $SS1_2$ may have been taken before one or more write operations of R1 have been replicated to R2.

In response to receiving the acknowledgement from A2, A1 may close the consistency window and resume initiating processing of new write requests received from any host system for R1. In some embodiments, the steps 1402-1412 may be considered part of Phase 1 of remotely replicating snapshots.

In a step 1414, the outstanding write requests of $SS1_1$ may be applied to $SS1_2$, for example, as described in more detail elsewhere herein. The outstanding write requests may be applied concurrently to the ongoing replication of write requests from R1 to R2, for example as part of a separate (e.g., background) process. The step 1414 may be considered part of Phase 2 of remotely replicating snapshots.

Figure 16:
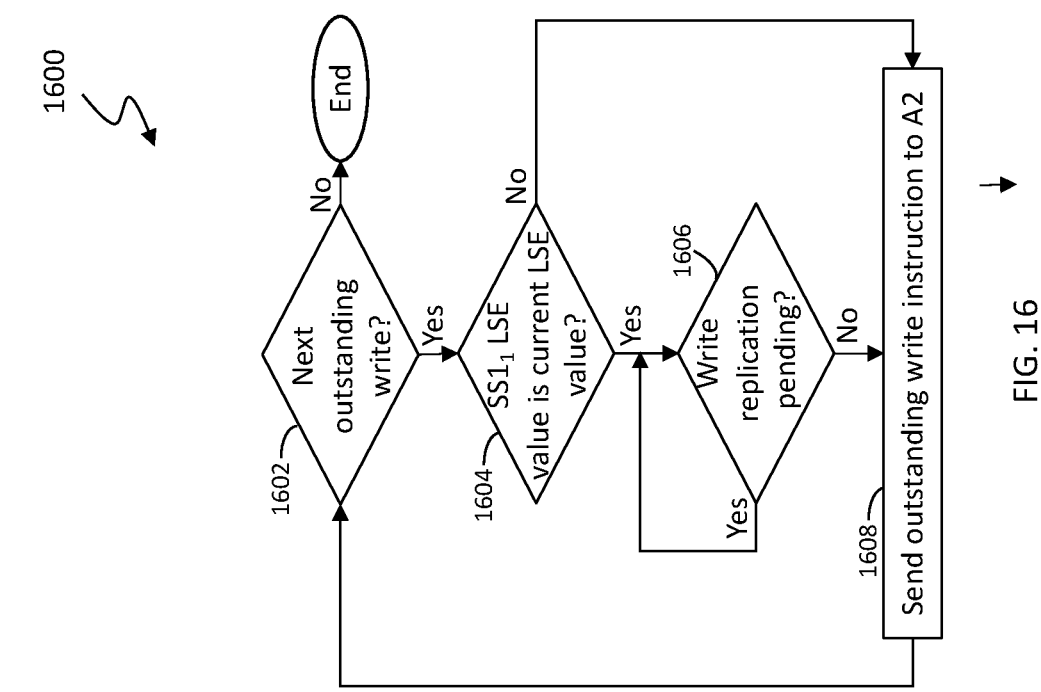
FIG. 16 is a flow diagram illustrating an example of a method performed by a first storage system as part of remotely replicating snapshots from the first storage system to a second storage system, according to embodiments of the invention.

Applying the outstanding write requests for $SS1_1$ in Phase 2 may include processing on A1 and A2. FIG. 16 is a flow diagram illustrating an example of a method 1600 performed by a first storage system, A1, as part of remotely replicating snapshots from R1 to a second storage system, A2, according to embodiments of the invention. Other embodiments of a method performed by A1 as part of remotely replicating snapshots from R1 to R2, for example, variations of the method 1600, are possible and are intended to fall within the scope of the invention. The method 1600 may be performed by A1 as part of the Phase 2 processing. One or more components of A1, for example, one or more of the directors 37*a-n* or directors 216*a-n* described in more detail in relation to FIGS. 1 and 2 may be configured to collectively implement the method 1600.

In a step 1602, it may be determined whether there is a next outstanding write request to process for an LSE of R1 for $SS1_1$, for example, by accessing $SS1_1$ outstanding write entries in the outstanding write log 1500. If there is not a next outstanding write entry, the method 1600 may end. Otherwise, in a step 1604, it may be determined whether R1 LSE metadata points to the current data of the R1 LSE; i.e., points to a same storage location as the current R1 LSE metadata. The snapshot metadata of the R1 LSE may include the sequence number table 130, RDP table 100 and/or RDP tree 110 described elsewhere herein or in Jaganathan or the snapshot look-up tables (SLTs), current look-up tables (CLTs) and snapshot pointer structures (SPSs) described in Tobin. The metadata for the current value of the R1 LSE may include the master LSU table 62, the LSU table 72, the thin device table 72' and the LSU track table 82 described in more detail elsewhere herein.

If the R1 LSE metadata points to the current data of the R1 LSE, then, in a step 1606, it may be determined whether the remote replication of any write operations for the R1 LSE are still pending. If so, Phase 2 processing of any outstanding write requests of R1, or perhaps only the LSE in particular, may be suspended until acknowledgements are received from A2 that the outstanding write requests for the R1 LSE have been completed (e.g., cached or stored on a physical storage device) on A2.

In some embodiments, rather than waiting for the replication-pending writes of the R1 LSE to complete, it may be may recorded (e.g., in a data structure) that the R1 LSE has replication-pending writes, and the Phase 2 processing of other R1 LSEs on A1 may continue. A list of R1 LSEs having replication-pending writes may be maintained on A1. After Phase 2 processing for the last R1 LSE not having replication-pending writes is completed, the Phase 2 processing may return to the R1 LSEs having replication-pending writes, for example, by accessing the list of replication-pending LSEs. Returning to the R1 LSEs having replication-pending writes may be done in consideration that the replication-pending write operations of the LSEs may have been replicated to R2 (as part of typical replication processing) during the time that has elapsed since last checked, so that the previously noted replication-pending writes have now been acknowledged by A2 as complete. For any R1 LSE that still has a replication-pending write, the process may move on to the next R1 LSE of the list and attempt further Phase II processing of the R1 LSE, and repeat the foregoing process until there are no longer any replication-pending LSEs.

If it is determined in the step 1604 that R1 LSE metadata does not point to the current data of the R1 LSE, or after it is determined in the step 1606 that there are not any replication-pending writes for the R1 LSE, A1 may send outstanding write information about the outstanding write operation in an OWI to A2 in a step 1608. The OWI may specify any of: an ID of $SS1_1$; an ID of the R1 LSE; an ID of R2; and an indication of whether the value of the R1 LSE metadata for $SS1_1$ is the current value of R1 LSE, i.e., points to the storage location of the current value of R1 LSE, or is a value of snapshot data for R1 LSE for $SS1_1$, i.e., points to a location of snapshot data specific to R1 LSE for $SS1_1$.

Figure 17:
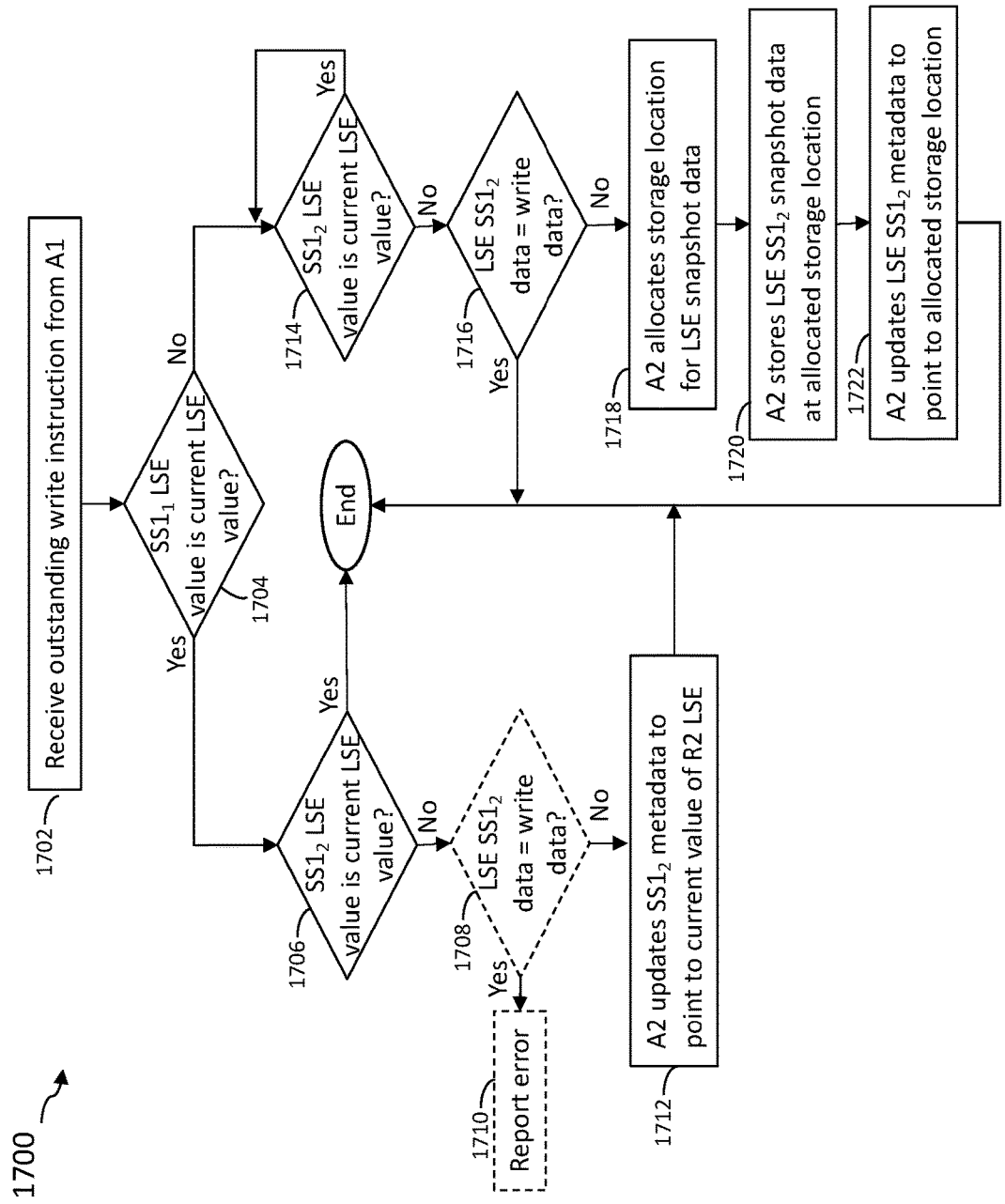
FIG. 17 is a flow diagram illustrating an example of a method performed by a second storage system as part of remotely replicating snapshots from a first storage system to the second storage system, according to embodiments of the invention.

FIG. 17 is a flow diagram illustrating an example of a method 1700 performed by a second storage system, R2, as part of remotely replicating snapshots from a first storage system, A1, to the second storage system, A2, according to embodiments of the invention. Other embodiments of a method performed by R2 as part of remotely replicating snapshots from R1 to R2, for example, variations of the method 1700, are possible and are intended to fall within the scope of the invention. The method 1700 may be performed by A2 as part of the Phase 2 processing. One or more components of A2, for example, one or more of the directors 37a-n or directors 216a-n described in more detail in relation to FIGS. 1 and 2 may be configured to collectively implement the method 1700.

In a step 1702, A2 may receive the OWI for the R1 LSE from A1, which may include, among other information, the R1 LSE state indicating whether the LSE $SS1_1$ metadata points to the current data of the R1 LSE or points to snapshot data of the R1 LSE.

In a step 1704, A2 may determine, for example, from the OWI, whether the $SS1_1$ LSE value is the current LSE value; i.e., whether the LSE $SS1_1$ metadata points to the current data of the R1 LSE. Alternatively, the step 1704 may determine whether the $SS1_1$ LSE value is a value of snapshot data for R1 LSE for $SS1_1$; i.e., whether the R1 LSE metadata for $SS1_1$ points to a location of snapshot data specific to R1 LSE for $SS1_1$.

If it is determined that the $SS1_1$ LSE value is the current LSE value (or alternatively that the $SS1_1$ LSE value is not a snapshot data value for R1 LSE for $SS1_1$), then it may be determined in a step 1706 whether the LSE $SS1_2$ metadata points to the current data of the R2 LSE. Alternatively, the step 1706 may determine whether the $SS1_2$ LSE value is a value of snapshot data for R2 LSE for $SS1_1$; i.e., whether the R2 LSE metadata for $SS1_1$ points to a location of snapshot data specific to R2 LSE for $SS1_2$. The snapshot metadata of the R2 LSE may include the sequence number table 130, RDP table 100 and/or RDP tree 110 described elsewhere herein or in Jaganathan or the snapshot look-up tables (SLTs), current look-up tables (CLTs) and snapshot pointer structures (SPSs) described in Tobin. The metadata for the current value of the R2 LSE may include the master LSU table 62, the LSU table 72, the thin device table 72' and the LSU track table 82 described in more detail elsewhere herein.

If it is determined in the step 1706 that the LSE $SS1_2$ metadata points to the current data of the R2 LSE (or alternatively that the $SS1_2$ LSE value is not a value of snapshot data for R2 LSE for $SS1_1$), then $SS1_2$ LSE metadata points to the same current data as the $SS1_1$ LSE metadata. That is, as the $SS1_1$ LSE metadata points to the current data of the R1 LSE value, and the process described in relation to the step 1606 ensured that, if the $SS1_1$ LSE metadata points to the current data of the R1 LSE value, any replication-pending writes were completed on R2 before the OCI was sent, this means that there are not any R1 LSE write operations that have not reached R2 LSE yet. Thus, because both $SS1_1$ LSE metadata and $SS1_2$ LSE metadata point to their respective current LSE values, these values are the same values. Accordingly, if it is determined in the step 1706 that the LSE $SS1_2$ metadata points to the current data of the R2 LSE, the method may end.

If it is determined in the step 1706 that the LSE $SS1_2$ metadata does not point to the current data of the R2 LSE (or alternatively that the $SS1_2$ LSE value is a value of snapshot data for R2 LSE for $SS1_1$), this means that the outstanding write operation specified in the OWI received in the step 1702 was performed on R1 before $SS1_1$ was taken but was performed on R2 after $SS1_2$ was taken. Accordingly, if it is determined in the step 1706 that the LSE $SS1_2$ metadata does not point to the current data of the R2 LSE, A2 may update the $SS1_2$ metadata to point to the current value of the R2 LSE in a step 1712.

It should be noted that, if it is determined in the step 1706 that the LSE $SS1_2$ metadata does not point to the current data of the R2 LSE, then the LSE $SS1_2$ metadata points to snapshot data for R2 LSE for $SS1_1$, and it should not be possible for this snapshot data to be the value of the outstanding write data of the OWI received in the step 1702. However, it may be desirable to compare this snapshot data to the value of the outstanding write data as a kind of sanity check. Accordingly, in a some embodiments, if it is determined in the step 1706 that the LSE $SS1_2$ metadata does not point to the current data of the R2 LSE (or alternatively that the $SS1_2$ LSE value is a value of snapshot data for R2 LSE for $SS1_1$), then it may be determined in a step 1708 whether the snapshot data for R2 LSE for $SS1_1$ has the same value as the outstanding write data of the OWI, and if so, an error may be reported. Otherwise, the method may proceed to the step 1712.

Returning to the step 1704, if it is determined that the $SS1_1$ LSE value is not the current LSE value (or alternatively that the $SS1_1$ LSE value is a value of snapshot data for R1 LSE for $SS1_1$), this means that a write operation was performed on the LSE after $SS1_1$ was taken. This performed on then in a step 1714, and in a step 1706 it may be determined whether the LSE $SS1_2$ metadata points to the current data of the R2 LSE (or alternatively whether the $SS1_2$ LSE value is a value of snapshot data for R2 LSE for $SS1_1$).

As it is known from the result of step 1714 that a write operation was performed on the R1 LSE after $SS1_1$ was taken, if it is determined in the step 1714 that the LSE $SS1_2$ metadata points to the current data of the R2 LSE (or alternatively that the $SS1_2$ LSE value is not a value of snapshot data for R2 LSE for $SS1_1$), this means that the write operation performed on the R1 LSE after $SS1_1$ was taken has not been performed on R2 yet. However, the outstanding write operation specified by the OCI may not be the write operation performed on the R1 LSE after $SS1_1$ was taken, but may be an earlier write operation performed on the R1 LSE before $SS1_1$ was taken, which also has not yet been performed on R2 yet. Accordingly, in an embodiment, if it is determined in the step 1714 that the LSE $SS1_2$ metadata points to the current data of the R2 LSE, the step 1714 may be repeated (i.e., the method 1700 may wait) until it is determined in the step 1714 that that the LSE $SS1_2$ metadata does not point to the current data of the R2 LSE (or alternatively that the $SS1_2$ LSE value is a value of snapshot data for R2 LSE for $SS1_1$), in which case it may be determined in a step 1716 whether the snapshot data for R2 LSE for $SS1_1$ has the same value as the outstanding write data of the OWI.

In some embodiments, rather than waiting until it is determined in the step 1714 that that the R2 LSE $SS1_2$ metadata does not point to the current data of the R2 LSE, it may be may recorded (e.g., in a data structure) that the R2 LSE $SS1_2$ has replication-pending writes, and the method 1700 may end for the R2 LSE $SS1_2$ (and performed again for any new OWIs received). A list of R2 LSEs having replication-pending writes may be maintained on A2. After a first pass of the method 1700 is performed for any OCIs for R2, the method 1700 may be performed again for any R2 LSEs determined to have replication-pending writes on an earlier (e.g., first) pass, for example, by accessing the list of replication-pending LSEs. Returning to the R2 LSEs having replication-pending writes may be done in consideration that the replication-pending write operations of the LSEs may have been replicated to R2 (as part of typical replication processing) during the time that has elapsed since last checked, so that the previously noted replication-pending writes have now been performed on R2. For any R2 LSE that still has a replication-pending write on a given pass through the method 1700, the method 1700 may be performed on to the next R2 LSE of the list, and the foregoing process may be repeated until there are no longer any replication-pending LSEs for R2.

If it is determined in the step 1716 that the snapshot data has the same value as the outstanding write data, this means that the LSE $SS1_2$ metadata and the LSE $SS1_1$ metadata point to a same snapshot value, meaning that the outstanding write operation of the OWI was received after $SS1_1$ was taken on A1 and after $SS1_2$ was taken on A2, but has already been applied to both R1 and R2. Accordingly, if it is determined in the step 1716 that the snapshot data for R2 LSE for $SS1_1$ has the same value as the outstanding write data of the OWI, the method 1700 may end.

If it is determined in the step 1716 that the snapshot data for R2 LSE for $SS1_1$ does not have the same value as the outstanding write data of the OWI, this means that: a) an earlier write operation was performed on R1 LSE before $SS1_1$ was taken, but was performed on R2 LSE after $SS1_2$ was taken; and b) the outstanding write operation of the OWI was performed on R1 LSE after $SS1_1$ was taken, but has not yet been performed on R2 LSE. As a result, the LSE $SS1_2$ metadata points to wrong snapshot data, and should be fixed.

Accordingly, if it is determined in the step 1716 that the snapshot data for R2 LSE for $SS1_1$ does not have the same value as the outstanding write data of the OWI, A2 may allocate a storage location (e.g., from a pool of storage reserved for snapshot data) for the outstanding write data of the OWI, and the outstanding write data may be stored at the allocated location in a step 1720. In a step 1722, the LSE $SS1_2$ metadata may be modified to point to the allocated location, for example, as described herein, in Jaganathan and/or in Tobin.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100, 1200, 1300, 1400, 1600 and 1700, or parts thereof, may be implemented using one or more of the systems and/or data structures described in relation to FIGS. 1-10 and 15, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, or any suitable combination thereof.

Software implementations of embodiments of the invention may include executable code that is stored on one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicate a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a host system, a first storage system, a second storage system, a first logical storage unit for which data is replicated from the first storage system to a second logical storage unit of the second storage system, a method of remotely replicating a first snapshot of the first logical storage unit from the first storage system to the second storage system, the method comprising:
   while performing synchronous replication synchronously replicating write requests, that are directed to the first logical storage unit of the first storage system, to the second logical storage unit of the second data storage system, concurrently performing first processing that remotely replicates snapshots of the first logical storage unit to the second logical storage unit, said first processing including:
      at a first point in time while performing said synchronous replication, the first storage system suspending initiating of processing of new write requests for the first logical storage unit that are received at the first storage system from the host system after the first point in time;
      after said suspending, recording at least a first outstanding write request for the first logical storage unit on the first storage system, wherein each outstanding write request of the at least first outstanding write request is received from the host system at the first storage system and is outstanding at the first point in time when initiating processing of new write requests for the first logical storage unit is suspended by said suspending, and wherein said each outstanding write request is outstanding in that servicing of the said each outstanding write request has been initiated and the first storage system has not yet returned an acknowledgement to the host system regarding completion of said each outstanding write request;
      after said recording, taking the first snapshot on the first storage system;
      after said taking the first snapshot on the first storage system, the first storage system sending an instruction to the second storage system to initiate taking a second snapshot of the second logical storage unit;
      responsive to the second storage system receiving, from the first storage system, the instruction to initiate the second storage system taking the second snapshot, the second storage system taking the second snapshot of the second logical storage unit;
      responsive to taking the second snapshot, sending an acknowledgment from the second storage system to the first storage system regarding the taking of the second snapshot of the second logical storage unit; and
      after the recording, the taking the first snapshot and the taking the second snapshot, performing processing including:
         resuming the initiating of processing of new write requests for the first logical storage unit on the first storage system; and
         applying the at least first outstanding write request to the second snapshot so that after performing said applying, the second snapshot is a remote replica of the first snapshot.

2. The method of claim 1, wherein the applying is performed as part of a process executing independently of, and concurrently with, one or more processes that are remotely replicating write operations of the first logical storage unit to the second logical storage unit.

3. The method of claim 1, wherein said applying the at least first outstanding write request includes, for each outstanding write request of the at least first outstanding write request:
   determining whether the outstanding write request requires modification of snapshot data of the second snapshot; and
   if it is determined that the outstanding write request requires modification of the second snapshot, modifying the snapshot data and snapshot metadata of the second snapshot on the second storage system based on the outstanding write request.

4. The method of claim 3, wherein the first outstanding write request specifies a write operation for a first logical storage element corresponding to a second logical storage element of the second logical storage unit, and wherein said determining whether the first outstanding write request requires modification of snapshot data of the second snapshot includes:
   determining whether first snapshot metadata of the first snapshot references a first current value of the first logical storage element on the first storage system;
   determining whether second snapshot metadata of the second snapshot references a second current value of the second logical storage element on the second storage system; and
   determining whether to modify the snapshot data and snapshot metadata of the second snapshot based at least in part on whether the first snapshot metadata references the first current value and whether the second snapshot metadata references the second current value.

5. The method of claim 4, wherein said determining whether the first outstanding write request requires modification of snapshot data of the second snapshot includes:
   determining that the first snapshot metadata references the first current value of the first logical storage element;
   determining that the second snapshot metadata does not reference the second current value of the second logical storage element; and
   modifying the snapshot metadata of the second snapshot to reference the second current value of the second logical storage element.

6. The method of claim 4, wherein said determining whether the first outstanding write request requires modification of snapshot data of the second snapshot includes:
   determining whether a first value of the second logical storage element specified by the second snapshot metadata is a same value as a second value of the second logical storage element specified by the write operation; and
   determining whether to modify the snapshot data and snapshot metadata of the second snapshot based at least in part on whether the first value is the same value as the second value.

7. The method of claim 4, wherein said determining whether the first outstanding write request requires modification of snapshot data of the second snapshot includes:
  determining that the first snapshot metadata does not reference the first current value of the first logical storage element;
  determining that the second snapshot metadata does not reference the second current value of the second logical storage element;
  storing the second value of the second logical storage element at a location on the second storage system; and
  modifying the snapshot metadata of the second snapshot to reference the location.

8. A system comprising:
  a first storage system;
  a second storage system;
  a third storage system;
  a logical storage unit synchronously replicated between the first storage system and the second system, wherein the logical storage unit is asynchronously replicated from the first storage system to the third storage system and asynchronously replicated from the second storage system to the third storage system; and
  executable logic that implements a method including:
    while performing synchronous replication synchronously replicating write requests, that are directed to the first logical storage unit of the first storage system, to the second logical storage unit of the second data storage system, concurrently performing first processing that remotely replicates snapshots of the first logical storage unit to the second logical storage unit, said first processing including:
      at a first point in time while performing said synchronous replication, the first storage system suspending initiating of processing of new write requests for the first logical storage unit that are received at the first storage system from the host system after the first point in time;
      after said suspending, recording at least a first outstanding write request for the first logical storage unit on the first storage system, wherein each outstanding write request of the at least first outstanding write request is received from the host system at the first storage system and is outstanding at the first point in time when initiating processing of new write requests for the first logical storage unit is suspended by said suspending, and wherein said each outstanding write request is outstanding in that servicing of the said each outstanding write request has been initiated and the first storage system has not yet returned an acknowledgement to the host system regarding completion of said each outstanding write request;
      after said recording, taking the first snapshot on the first storage system;
      after said taking the first snapshot on the first storage system, the first storage system sending an instruction to the second storage system to initiate taking a second snapshot of the second logical storage unit;
      responsive to the second storage system receiving, from the first storage system, the instruction to initiate the second storage system taking the second snapshot, the second storage system taking the second snapshot of the second logical storage unit;
      responsive to taking the second snapshot, sending an acknowledgment from the second storage system to the first storage system regarding the taking of the second snapshot of the second logical storage unit; and
      after the recording, the taking the first snapshot and the taking the second snapshot, performing processing including:
        resuming the initiating of processing of new write requests for the first logical storage unit on the first storage system; and
        applying the at least first outstanding write request to the second snapshot so that after performing said applying, the second snapshot is a remote replica of the first snapshot.

9. The system of claim 8, wherein the applying is performed as part of a process executing independently of, and concurrently with, one or more processes that are remotely replicating write operations of the first logical storage unit to the second logical storage unit.

10. The system of claim 8, wherein said applying the at least first outstanding write request includes, for each outstanding write request of the at least first outstanding write request:
  determining whether the outstanding write request requires modification of snapshot data of the second snapshot; and
  if it is determined that the outstanding write request requires modification of the second snapshot, modifying the snapshot data and snapshot metadata of the second snapshot on the second storage system based on the outstanding write request.

11. The system of claim 8, wherein the first outstanding write request specifies a write operation for a first logical storage element corresponding to a second logical storage element of the second logical storage unit, and wherein said determining whether the first outstanding write request requires modification of snapshot data of the second snapshot includes:
  determining whether first snapshot metadata of the first snapshot references a first current value of the first logical storage element on the first storage system;
  determining whether second snapshot metadata of the second snapshot references a second current value of the second logical storage element on the second storage system; and
  determining whether to modify the snapshot data and snapshot metadata of the second snapshot based at least in part on whether the first snapshot metadata references the first current value and whether the second snapshot metadata references the second current value.

12. The system of claim 11, wherein said determining whether the first outstanding write request requires modification of snapshot data of the second snapshot includes:
  determining that the first snapshot metadata references the first current value of the first logical storage element;
  determining that the second snapshot metadata does not reference the second current value of the second logical storage element; and
  modifying the snapshot metadata of the second snapshot to reference the second current value of the second logical storage element.

13. The system of claim 11, wherein said determining whether the first outstanding write request requires modification of snapshot data of the second snapshot includes:
  determining whether a first value of the second logical storage element specified by the second snapshot metadata is a same value as a second value of the second logical storage element specified by the write operation; and determining whether to modify the snapshot data and snapshot metadata of the second snapshot based at least in part on whether the first value is the same value as the second value.

14. The system of claim 11, wherein said determining whether the first outstanding write request requires modification of snapshot data of the second snapshot includes:

determining that the first snapshot metadata does not reference the first current value of the first logical storage element;

determining that the second snapshot metadata does not reference the second current value of the second logical storage element;

storing the second value of the second logical storage element at a location on the second storage system; and modifying the snapshot metadata of the second snapshot to reference the location.

15. For a system including a host system, a first storage system, a second storage system, a first logical storage unit for which data is replicated from the first storage system to a second logical storage unit of the second storage system, one or more non-transitory computer-readable media having code stored thereon that, when executed, performs a method of remotely replicating a first snapshot of the first logical storage unit from the first storage system to the second storage system comprising:

while performing synchronous replication synchronously replicating write requests, that are directed to the first logical storage unit of the first storage system, to the second logical storage unit of the second data storage system, concurrently performing first processing that remotely replicates snapshots of the first logical storage unit to the second logical storage unit, said first processing including:

at a first point in time while performing said synchronous replication, the first storage system suspending initiating of processing of new write requests for the first logical storage unit that are received at the first storage system from the host system after the first point in time;

after said suspending, recording at least a first outstanding write request for the first logical storage unit on the first storage system, wherein each outstanding write request of the at least first outstanding write request is received from the host system at the first storage system and is outstanding at the first point in time when initiating processing of new write requests for the first logical storage unit is suspended by said suspending, and wherein said each outstanding write request is outstanding in that servicing of the said each outstanding write request has been initiated and the first storage system has not yet returned an acknowledgement to the host system regarding completion of said each outstanding write request;

after said recording, taking the first snapshot on the first storage system;

after said taking the first snapshot on the first storage system, the first storage system sending an instruction to the second storage system to initiate taking a second snapshot of the second logical storage unit;

responsive to the second storage system receiving, from the first storage system, the instruction to initiate the second storage system taking the second snapshot, the second storage system taking the second snapshot of the second logical storage unit;

responsive to taking the second snapshot, sending an acknowledgment from the second storage system to the first storage system regarding the taking of the second snapshot of the second logical storage unit; and after the recording, the taking the first snapshot and the taking the second snapshot, performing processing including:

resuming the initiating of processing of new write requests for the first logical storage unit on the first storage system; and applying the at least first outstanding write request to the second snapshot so that after performing said applying, the second snapshot is a remote replica of the first snapshot.

16. The one or more non-transitory computer-readable media of claim 15, wherein said applying the at least first outstanding write request includes, for each outstanding write request of the at least first outstanding write request:

determining whether the outstanding write request requires modification of snapshot data of the second snapshot; and if it is determined that the outstanding write request requires modification of the second snapshot, modifying the snapshot data and snapshot metadata of the second snapshot on the second storage system based on the outstanding write request.

17. The one or more non-transitory computer-readable media of claim 16, wherein the first outstanding write request specifies a write operation for a first logical storage element corresponding to a second logical storage element of the second logical storage unit, and wherein said determining whether the first outstanding write request requires modification of snapshot data of the second snapshot includes:

determining whether first snapshot metadata of the first snapshot references a first current value of the first logical storage element on the first storage system;

determining whether second snapshot metadata of the second snapshot references a second current value of the second logical storage element on the second storage system; and determining whether to modify the snapshot data and snapshot metadata of the second snapshot based at least in part on whether the first snapshot metadata references the first current value and whether the second snapshot metadata references the second current value.

18. The one or more non-transitory computer-readable media of claim 17, wherein said determining whether the first outstanding write request requires modification of snapshot data of the second snapshot includes:

determining that the first snapshot metadata references the first current value of the first logical storage element;

determining that the second snapshot metadata does not reference the second current value of the second logical storage element; and modifying the snapshot metadata of the second snapshot to reference the second current value of the second logical storage element.

19. The one or more non-transitory computer-readable media of claim 17, wherein said determining whether the first outstanding write request requires modification of snapshot data of the second snapshot includes:

determining whether a first value of the second logical storage element specified by the second snapshot metadata is a same value as a second value of the second logical storage element specified by the write operation; and determining whether to modify the snapshot data and snapshot metadata of the second snapshot based at least in part on whether the first value is the same value as the second value.

20. The one or more non-transitory computer-readable media of claim 17, wherein said determining whether the first outstanding write request requires modification of snapshot data of the second snapshot includes:

determining that the first snapshot metadata does not reference the first current value of the first logical storage element;

determining that the second snapshot metadata does not reference the second current value of the second logical storage element;

storing the second value of the second logical storage element at a location on the second storage system; and modifying the snapshot metadata of the second snapshot to reference the location.

\* \* \* \* \*